(12) United States Patent
Chen-Ho et al.

(10) Patent No.: US 10,845,514 B2
(45) Date of Patent: Nov. 24, 2020

(54) RETROREFLECTIVE COLORED ARTICLES

(71) Applicant: 3M INNOVATIVE PROPERTIES COMPANY, St. Paul, MN (US)

(72) Inventors: Kui Chen-Ho, Woodbury, MN (US); Matthew S. Stay, Minneapolis, MN (US); Ying Xia, Woodbury, MN (US); Syud M. Ahmed, Minneapolis, MN (US); Cordell M. Hardy, Woodbury, MN (US); Shri Niwas, Maple Grove, MN (US); Michael A. McCoy, St. Paul, MN (US); Mikhail L. Pekurovsky, Bloomington, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 15/512,865

(22) PCT Filed: Sep. 24, 2015

(86) PCT No.: PCT/US2015/051864
§ 371 (c)(1),
(2) Date: Mar. 21, 2017

(87) PCT Pub. No.: WO2016/053734
PCT Pub. Date: Apr. 7, 2016

(65) Prior Publication Data
US 2017/0293056 A1    Oct. 12, 2017

Related U.S. Application Data

(60) Provisional application No. 62/057,463, filed on Sep. 30, 2014.

(51) Int. Cl.
*G02B 5/126* (2006.01)
*G02B 5/128* (2006.01)

(52) U.S. Cl.
CPC ............. *G02B 5/128* (2013.01); *G02B 5/126* (2013.01)

(58) Field of Classification Search
CPC .............................. G02B 5/128; G02B 5/126
USPC ........................................................ 359/535
See application file for complete search history.

(56) References Cited

U.S. PATENT DOCUMENTS

| 1,175,224 A | 3/1916 | Bleecker |
| 2,461,011 A | 2/1949 | Taylor |
| 2,726,161 A | 12/1955 | Beck |
| 2,842,446 A | 7/1958 | Beck |

(Continued)

FOREIGN PATENT DOCUMENTS

| CN | 201594149 | 9/2010 |
| CN | 202886633 | 4/2013 |

(Continued)

OTHER PUBLICATIONS

Chopra, Thin Film Phenomena, 750 (1969).

(Continued)

*Primary Examiner* — Euncha P Cherry

(57) ABSTRACT

Provided herein are retroreflective colored article having a predetermined pattern of beaded and unbeaded regions and at least one polymeric color layer (130) covering at least a portion of the beaded and unbeaded regions, a reflector layer (140) covering the colour layer, and a carrier (150). Also disclosed are methods for making the articles.

20 Claims, 10 Drawing Sheets

(56) References Cited

U.S. PATENT DOCUMENTS

| | | |
|---|---|---|
| 2,853,393 A | 9/1958 | Beck |
| 2,870,030 A | 1/1959 | Stradley |
| 2,939,797 A | 6/1960 | Rindone |
| 2,965,921 A | 12/1960 | Bland |
| 2,992,122 A | 7/1961 | Beck |
| 3,468,681 A | 9/1969 | Jaupain |
| 3,700,305 A | 10/1972 | Bigham |
| 3,946,130 A | 3/1976 | Tung |
| 4,102,562 A | 7/1978 | Harper |
| 4,192,576 A | 3/1980 | Tung |
| 4,367,919 A | 1/1983 | Tung |
| 4,564,556 A | 1/1986 | Lange |
| 4,758,469 A | 7/1988 | Lange |
| 4,763,985 A | 8/1988 | Bingham |
| 4,772,511 A | 9/1988 | Wood |
| 4,931,414 A | 6/1990 | Wood |
| 5,200,262 A | 4/1993 | Li |
| 5,283,101 A | 2/1994 | Li |
| 5,344,705 A | 9/1994 | Olsen |
| 5,503,906 A | 4/1996 | Olsen |
| 5,620,613 A | 4/1997 | Olsen |
| 5,645,938 A | 7/1997 | Crandall |
| 5,812,317 A | 9/1998 | Billingsley |
| 5,962,121 A | 10/1999 | Mori |
| 5,976,669 A | 11/1999 | Fleming |
| 5,988,821 A | 11/1999 | Tamaka |
| 6,153,128 A | 11/2000 | Lightle |
| 6,361,850 B1 | 3/2002 | Billingsley |
| 6,416,856 B1 | 7/2002 | Crandall |
| 6,735,789 B2 | 5/2004 | Kelleher |
| 6,931,665 B2 | 8/2005 | Feduzi |
| 7,111,949 B2 | 9/2006 | Parisi |
| 7,463,154 B2 | 12/2008 | Cortina |
| 8,003,197 B2 | 8/2011 | Yukawa |
| 8,470,394 B2 | 6/2013 | Koppes |
| 2006/0051559 A1 | 3/2006 | Sleeman |
| 2006/0072198 A1* | 4/2006 | Parisi ............... D06P 1/0012 |
| | | 359/536 |
| 2006/0188700 A1 | 8/2006 | Yukawa |
| 2007/0188866 A1* | 8/2007 | Yukawa ............... B32B 7/02 |
| | | 359/530 |
| 2008/0026193 A1 | 1/2008 | Koppes |
| 2011/0045176 A1 | 2/2011 | Koppes |
| 2011/0292508 A1 | 12/2011 | Huang |
| 2012/0050863 A1* | 3/2012 | Krishnan ............ G02B 5/128 |
| | | 359/540 |
| 2014/0022641 A1 | 1/2014 | Yoon |

FOREIGN PATENT DOCUMENTS

| | | |
|---|---|---|
| JP | S60-205501 | 10/1985 |
| JP | S62-62301 | 3/1987 |
| JP | 2988751 | 2/1993 |
| JP | 93-30047 | 6/1996 |
| JP | H09-137390 | 5/1997 |
| JP | 10-332915 | 12/1998 |
| JP | 2002-014212 | 1/2002 |
| JP | 3498070 | 1/2002 |
| JP | 2003-182292 | 7/2003 |
| JP | 2003-315517 | 11/2003 |
| JP | 2004-062123 | 2/2004 |
| JP | 2004-138671 | 5/2004 |
| JP | 2005-165302 | 6/2005 |
| JP | 3158587 | 4/2010 |
| WO | WO 1996/16343 | 5/1996 |
| WO | WO 1998/28642 | 7/1998 |
| WO | WO 2000/79314 | 12/2000 |
| WO | WO 2002/103108 | 12/2002 |
| WO | WO 2004/113970 | 12/2004 |
| WO | WO 2007/046157 | 4/2007 |
| WO | WO 2011/147079 | 12/2011 |
| WO | WO 2013/043827 | 3/2013 |
| WO | WO 2015/175024 | 11/2015 |

OTHER PUBLICATIONS

Lewis Sr., Hawley's Condensed Chemical Dictionary, (1993).
International Search Report for PCT International Application No. PCT/US2015/051864, dated Dec. 18, 2015, 6pgs.

* cited by examiner

RETROREFLECTIVE COLORED ARTICLES

CROSS REFERENCE TO RELATED APPLICATIONS

This application is a national stage filing under 35 U.S.C. 371 of PCT/US2015/051864, filed Sep. 24, 2015, which claims the benefit of Provisional Application No. 62/057,463, filed Sep. 30, 2014, the disclosure of which is incorporated by reference in its/their entirety herein.

FIELD OF THE DISCLOSURE

This disclosure relates to retroreflective articles, especially retroreflective colored articles and methods of making and using them.

BACKGROUND

A wide variety of articles that incorporate the phenomenon of retroreflectivity have been developed for a wide array of uses. Retroreflective articles have the ability to return a substantial portion of incident light back towards the light source. This unique ability has promoted widespread use of retroreflective safety articles. Besides traffic and warning signs and the like, a wide variety of clothing and similar articles such as backpacks, and the like have incorporated retroreflective articles into them. Persons who work or exercise near motor vehicle traffic need to be conspicuously visible so that they do not get struck by passing motor vehicles. When retroreflective articles are worn, the retroreflectivity highlights a person's presence by retroreflecting light from motor vehicle headlamps.

Retroreflective articles typically have an optical lens element layer, a polymeric bead bond layer, a reflective layer, and may also have a substrate layer. The optical lens elements commonly are microsphere beads that are partially embedded in the polymeric bead bond layer. The reflective layer typically is aluminum, silver, or a dielectric mirror that usually is disposed on the embedded portions of the microsphere beads. Light striking the front surface of the retroreflective article passes through the microsphere beads and is reflected by the reflective layer to re-enter the microsphere beads where the light's direction is then altered to travel back towards the light source. Thus, for example, when a vehicle's headlamps strike a retroreflective article, some of the light from the headlamps is reflected back to the driver of the vehicle.

It is generally not necessary, or even desirable, that an entire worn article be retroreflective, so retroreflective appliqués are often used. These retroreflective appliqués can then be attached to an article of clothing or other article to prepare a retroreflective article. In some instances, retroreflective appliqués have been made by partially embedding a microsphere layer in a thermoplastic carrier web, applying a reflective material over the microsphere beads' protruding portions, and then forming a bead bond layer over the coated microsphere beads. Often a pressure sensitive adhesive is applied on the bead bond layer's back surface, and a release liner is placed over the adhesive until the appliqué is secured to a substrate. This type of appliqué, a transfer film appliqué, is supplied to a garment assembler in this form, and the garment assembler secures the appliqué to an article of clothing by removing the release liner and adhering the appliqué to an outer surface of the article of clothing. The carrier is then separated from the appliqué to expose the microsphere beads so that the appliqué can retroreflect light.

A different type of appliqué, referred to herein as a fixed appliqué, consists of a retroreflective article permanently applied to a fabric or material with the bead layer exposed. The fixed appliqué can be sewn onto, or otherwise attached to, a garment or other item.

A number of retroreflective articles have been prepared and described. For example, in U.S. Pat. No. 6,153,128 (Lightle et al.), retroreflective articles are described with first and second segments, each comprising a binder layer and a multitude of microsphere beads embedded in the front surface of the binder layer. The first segment has an opaque reflective metal layer disposed on the embedded portions of the microsphere beads, whereas the second segment lacks such an opaque reflective layer and thereby allows the color of the underlying binder layer to be seen. US Patent Publication No. 2011/0292508 (Huang et al.) describes an exposed lens retroreflective articles that includes a binder layer, a layer of spaced apart optical elements that are partially embedded in the binder layer, a penetrated colored layer that is located between the spaced apart optical elements, and a reflective layer that is located functionally behind the layer of optical elements and the penetrated colored layer.

SUMMARY

Described herein are colored retroreflective articles, methods of making and using them, including the use of colored retroreflective articles on articles of clothing. A retroreflective article of the present description may comprise a layer of optical elements embedded in a bead bond layer, the optical elements comprising: a layer of transparent microsphere beads embedded in a bead bond layer in a predetermined pattern comprising beaded and unbeaded regions; at least one polymeric color layer covering at least a portion of the transparent microsphere beads embedded in the bead bond layer and covering at least a portion of each unbeaded region; and at least one reflective layer covering at least a portion of the polymeric color layer covering at least a portion of the transparent microsphere embedded in the bead bond layer.

An article of clothing of the present description may comprise a fabric with a first major surface and a second major surface; and a retroreflective appliqué attached to the first major surface of the fabric, the retroreflective applique comprising: a layer of optical elements embedded in a bead bond layer, the optical elements comprising: a layer of transparent microspheres beads embedded in a bead bond layer in a predetermined pattern comprising beaded and unbeaded regions; at least one polymeric color layer covering at least a portion of the transparent microsphere beads embedded in the bead bond layer and covering at least a portion of each unbeaded region; and at least one reflective layer covering at least a portion of the polymeric color layer covering at least a portion of the transparent microsphere embedded in the bead bond layer.

A method of preparing a retroreflective article of the present description may comprise providing a polymeric carrier having a first major surface and a second major surface; depositing barrier layer material onto portions of the first major surface of the polymeric carrier in a predetermined pattern; partially embedding transparent microsphere beads into the portions of the first major surface of the polymeric carrier not covered by the barrier layer material such that the beads at least partially protrude from the first major surface of the polymeric carrier; depositing a polymeric color layer on at least portions of the barrier layer material and portions of transparent microsphere beads; depositing a reflective layer on at least a portion of the polymeric color layer which covers the transparent microsphere beads; depositing a bead bond layer on at least a portion of the reflective layer and any exposed portions of underlying layers; and removing the polymeric carrier.

BRIEF DESCRIPTION OF THE DRAWINGS

The present application may be more completely understood in consideration of the following detailed description of various embodiments of the disclosure in connection with the accompanying drawings.

Figure 1A:
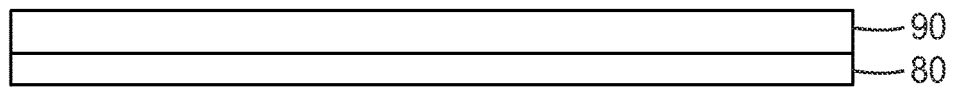
FIGS. 1a-1h show a method of making an embodiment of an article of this disclosure.

In the following description of the illustrated embodiments, reference is made to the accompanying drawings, in which is shown by way of illustration, various embodiments in which the disclosure may be practiced. It is to be understood that the embodiments may be utilized and structural changes may be made without departing from the scope of the present disclosure. The figures are not necessarily to scale. Like numbers used in the figures refer to like components. However, it will be understood that the use of a number to refer to a component in a given figure is not intended to limit the component in another figure labeled with the same number.

DETAILED DESCRIPTION

A variety of articles are retroreflective or have retroreflective appliqués that combine retroreflectivity with bright or fluorescent colors. Often articles have strips of retroreflective material and adjacent stripes of bright or fluorescent colors. In this way the articles provide high visibility in daylight due to the brightly colored or fluorescent strips and also are retroreflective for high visibility at night. An example is an article having two fluorescent yellow strips with a retroreflective strip located between the fluorescent yellow strips.

Retroreflectivity of an article can be expressed in terms of its coefficient of retroreflectivity ($R_A$)

$$R_A = E_r \cdot d^2 / E_s \cdot A$$

$R_A$=retroreflective intensity
$E_r$=illumination incident upon the receiver
$E_s$=illumination incident upon a plane perpendicular to the incident ray of the specimen position, measured in the same units as $E_r$
d=distance from the specimen to the projector
A=area of the test surface The coefficient of retroreflectivity ($R_A$) is further described in U.S. Pat. No. 3,700,305 (Bingham). In at least some embodiments, the articles of the present disclosure have an $R_A$ of at least 50, in other embodiments an $R_A$ of at least 100, in other embodiments, an $R_A$ of at least 200, and in other embodiments, an $R_A$ of at least 300.

Color is typically defined using a combination of color lightness (sometimes referred to as value or luminance) and chroma, which is a measure of saturation towards a particular color. Because human-perceived color is influenced by the nature of the human vision system, the measurement of color incorporates a weighting function (photopic function) to account for the non-uniform perception of color intensity by cones in the human eye across the visible wavelength range. Definition of perceived color is often described as a combination of three primary (tristimulus) color values defined by respective cone spectral sensitivity. The tristimulus values (often referred to as XYZ) are used to map a physical color to a perceived color. The color of a retroreflective article can be described in terms of a luminance-chromaticity color space (Y×y), where Y is the color luminance, and x and y are chromaticity coordinates. These values are related to the CIE XYZ color space (International Commission on Illumination (CIE 1931)):

$$x = X/(X+Y+Z)$$

$$y = Y/(X+Y+Z)$$

The advantage of using Y×y color space is that the chromaticity (described by x,y chromaticity coordinates) can be plotted on a chart, usually called the CIE x-y chromaticity diagram. This color representation/nomenclature is used in high visibility safety apparel regulatory standards such as ANSI/ISEA 107-2010 and ISO 20471: 2013 to define acceptable chromaticity ranges for fluorescent colors.

For example, Level 2 photometric requirements for ANSI/ISEA 107-2010 require a coefficient of retroreflection ($R_A$) of at least 330 cd/lux/m² at observation angle of 0.2 degrees and an entrance angle of 5 degrees. To meet this standard, fluorescent yellow-green colored articles must have a minimum luminance (Y) of at least 70. To meet this standard, fluorescent red-orange colored articles must have a luminance (Y) of at least 40. In addition to luminance, chromaticity for fluorescent color applications is defined by specified coordinate ranges. For example, the chromaticity for fluorescent yellow-green should fall with the space defined by the boundaries (0.387, 0.610), (0.356, 0.494), (0.398, 0.452), (0.460, 0.540). For fluorescent red-orange, the chromaticity should fall with the space defined by the boundaries (0.610, 0.390), (0.535, 0.375), (0.570, 0.340), (0.655, 0.344).

Another way of describing color is in terms of L*a*b*, and is often referred to as "CIE 1976 (L*, a*, b*) color space". The lightness of the color is described by L* (e.g. L*=100 for diffuse white, L*=0 for black), and the color coordinates a* and b* define coloration (in negative to positive values) from green to magenta, and blue to yellow, respectively. This system has the advantage of being more perceptually uniform over the color space range and is therefore useful to define low intensity (black) colors as described in some of the examples. As L* decreases (as the color becomes blacker), the effect of a* and b* on the perceived color become less pronounced. The Y×y and L*a*b* are related to the tristimulus XYZ values, and therefore each other, by a mathematical algorithm. Most commercially-available colorimeters can automatically provide color measurement data in either format. In at least some embodiments, the articles of the present disclosure have a minimum $R_A$ of at least 50 and an L* of less than 35.

Another aspect of retroreflective articles is their ability to maintain retroreflectivity and color quality after being washed a number of times. In at least some embodiments, articles of the present disclosure have a minimum $R_A$ value of at least 50 after fifty washes using ISO 6330 Method A. Delta E is the geometric distance between two color points in a cartesian L*a*b* space, e.g., delta E=sqrt{(delta L*)^2+(delta a*)^2+(delta b*)^2}. In at least some embodiments, articles of the present disclosure have a minimum $R_A$ value of at least 50 and a Delta E value of less than 5 after fifty washes using ISO 6330 Method A.

In some instances, to even further increase the visibility it would be desirable to have retroreflective articles in which the entire article is both retroreflective and has bright and fluorescent colors for high visibility in daylight. In this way, not only does the article have high visibility in daylight due to the bright or fluorescent colors, but the article has greater night visibility due to the increased retroreflectivity. This increased retroreflectivity not only enhances safety by increasing the visibility of the wearer, it also permits the use of smaller retroreflective articles to achieve this enhanced visibility. For example, if retroreflective appliqués are used to enhance the night visibility of an article of clothing, fewer appliqués or smaller appliqués can be used.

In some other instances it would be desirable for the article to have a non-fluorescent color such as a dark or light color such that it is not apparently retroreflective during the day, but provides the benefit of retroreflectivity at night. This addition of retroreflectivity may enhance safety by adding retroreflectivity to articles that might not normally have any retroreflectivity, thereby making a person more visible when a light is shined on a person than they might otherwise be.

However, making an article both entirely retroreflective as well as highly colored, is difficult to achieve because of the way retroreflective articles are made and how retroreflectivity is achieved. Typically retroreflective articles are prepared in a multi-step process. In this process, a thermoplastic polymeric carrier layer has a plurality of beads partially embedded in it. A reflective layer, either a reflective metal layer such as aluminum, silver or the like, or a partially transparent dielectric mirror, is applied to the protruding beads. A bead bond layer is applied to the coated microsphere layer, a transfer adhesive or fabric may be adhered to the bead bond layer, and the thermoplastic polymeric carrier layer is removed to generate the retroreflective article. For colored articles employing a partially transparent dielectric mirror, the coloring agent, either a pigment, a dye, or a combination thereof, is placed in the bead bond layer. When the reflective layer is a metal however, the colored bead bond layer is not visible. In the case of a metal mirror, regions that are retroreflective do not show the color, and regions that show the color, because there is no reflective metal layer on the beads, are not retroreflective.

In this disclosure, articles are described that have the desired feature of being both highly colored and retroreflective in the same region. These retroreflective articles contain a layer of optical elements, embedded in a bead bond layer, the optical elements comprising a layer of beads arranged in a predetermined pattern comprising beaded and unbeaded regions, at least one polymeric color layer covering at least a portion of the beads embedded in the bead bond layer and at least a portion of each unbeaded region, and at least one reflective layer covering at least a portion of the polymeric color layer covering at least a portion of the beads embedded in the bead bond layer. The polymeric color layer covering at least a portion of the beads embedded in the bead bond layer comprises a polymeric color layer, typically colored with at least one colorant.

Articles of this disclosure have increased color because both the beaded and unbeaded regions are colored, and yet retroreflectivity is still achieved. As was stated above, typically the retroreflective portions of a colored retroreflective article comprising a reflective metal layer are not colored, because if a colored layer is behind the reflective metal layer, the reflective metal layer hides the color from view. But placing a colored layer between the reflective metal layer and the bead surface can also be problematic because it tends to attenuate the light between the transparent microsphere beads and the reflective metal layer, and therefore only very thin and thus lightly colored layers seem suitable for use between the reflective metal layer and the bead surface.

In this disclosure articles are described that are prepared in such a way that regions of the polymeric color layer are not covered by beads. The unbeaded areas may either have an exposed polymeric color layer or may have a barrier layer material, which may be colored or clear, on the polymeric color layer. It was found that combining this feature of a colored, unbeaded region with the feature of a polymeric color layer between at least a portion of the bead surface and the reflective layer provided desirable color intensity and clarity and suitable levels of retroreflectivity for the retroreflective articles. These features thus allow for increasing the color intensity of a retroreflective article without unduly sacrificing retroreflectivity levels or allow for making colored articles retroreflective without unduly sacrificing color intensity.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The recitation of numerical ranges by endpoints includes all numbers subsumed within that range (e.g. 1 to 5 includes 1, 1.5, 2, 2.75, 3, 3.80, 4, and 5) and any range within that range.

As used in this specification and the appended claims, the singular forms "a", "an", and "the" encompass embodiments having plural referents, unless the content clearly dictates otherwise. For example, reference to "a layer" encompasses embodiments having one, two or more layers. As used in this specification and the appended claims, the term "or" is generally employed in its sense including "and/or" unless the content clearly dictates otherwise.

The term "bead" as used herein means transparent microsphere bead.

The phrase "barrier layer material" as used herein means any suitable material that substantially prevents beads from attaching to a layer on which the barrier layer material is applied, such as a polymeric carrier layer as disclosed herein.

The phrase "visible (or discernible) to the naked eye" as used herein means visible (or discernible) to person with 20/20 vision in ambient daylight (as defined, for example, using CIE standard illuminant D65) at a distance of 12 to 18 inches.

The term "interfuse" as used herein refers to two or more materials, at least one of which dissolves or mixes into another, either partially or completely.

As used herein, reference to an "unbeaded region" means a region substantially without beads where the region would or could contain beads if beads were deposited without a barrier layer material.

With respect to the definitions of "barrier material layer" and "unbeaded region," the term "substantially" means that a few beads might attach to the barrier layer material or unbeaded region, such as is seen in FIGS. 7, 9, 10, and 11.

The term "covering" as used herein does not imply any particular orientation. With respect to a first layer and a second layer in an article of the invention, the first layer may cover the second layer regardless of whether it is above or below the second layer in any given orientation of the product.

The term "adhesive" as used herein refers to polymeric compositions useful to adhere together two adherends. Examples of adhesives are pressure sensitive adhesives, heat activated adhesives and laminating adhesives.

Pressure sensitive adhesive compositions are well known to those of ordinary skill in the art to possess properties including the following: (1) aggressive and permanent tack at room temperature, (2) adherence with no more than finger pressure, (3) sufficient ability to hold onto an adherend, and (4) sufficient cohesive strength to be cleanly removable from the adherend. Materials that have been found to function well as pressure sensitive adhesives are polymers designed and formulated to exhibit the requisite viscoelastic properties resulting in a desired balance of tack, peel adhesion, and shear holding power. Obtaining the proper balance of properties is not a simple process.

Heat activated adhesives are non-tacky at room temperature but become tacky and capable of bonding to a substrate at elevated temperatures. These adhesives usually have a Tg or melting point (Tm) above room temperature. When the temperature is elevated above the Tg or Tm, the storage modulus usually decreases and the adhesive become tacky.

Laminating adhesives (also sometimes referred to as contact adhesives) are adhesives designed to form bonds to two substrates immediately after dispensing. Once the adhesive has been dispensed, there is a limited time, sometimes referred to as "open time" in which the adhesive can form a bond to two substrates. Once the open time has elapsed, the laminating adhesive is no longer capable of forming adhesive bonds. Examples of laminating adhesives are hot melt adhesives, solutions or dispersions of polymeric materials or materials curable to form polymeric materials in a liquid medium, and curable adhesives. The laminating adhesive is coated onto a substrate, a second substrate is contacted to the adhesive surface and the formed three layer construction is cooled, dried, and/or cured to form a laminate. Examples of laminating adhesives include the glue sticks used in hot glue guns (which are hot melt types of adhesives that form bonds upon cooling), casein glues, sometimes called "white glue", (which are water-borne dispersions that form bonds upon drying), and cyanoacrylate adhesives (which cure to form bonds upon exposure to air). Unless otherwise indicated, the terms "transparent" and "optically transparent" are used interchangeably and refer to an article, film or adhesive that has a high light transmittance over at least a portion of the visible light spectrum (about 400 to about 700 nm).

As used herein, the term "polymer" refers to a polymeric material that is a homopolymer or a copolymer. As used herein, the term "homopolymer" refers to a polymeric material that is the reaction product of one monomer. As used herein, the term "copolymer" refers to a polymeric material that is the reaction product of at least two different monomers.

The term "alkyl" refers to a monovalent group that is a radical of an alkane, which is a saturated hydrocarbon. The alkyl can be linear, branched, cyclic, or combinations thereof and typically has 1 to 20 carbon atoms. In some embodiments, the alkyl group contains 1 to 18, 1 to 12, 1 to 10, 1 to 8, 1 to 6, or 1 to 4 carbon atoms. Examples of alkyl groups include, but are not limited to, methyl, ethyl, n-propyl, isopropyl, n-butyl, isobutyl, tert-butyl, n-pentyl, n-hexyl, cyclohexyl, n-heptyl, n-octyl, and ethylhexyl.

The term "aryl" refers to a monovalent group that is aromatic and carbocyclic. The aryl can have one to five rings that are connected to or fused to the aromatic ring. The other ring structures can be aromatic, non-aromatic, or combinations thereof. Examples of aryl groups include, but are not limited to, phenyl, biphenyl, terphenyl, anthryl, naphthyl, acenaphthyl, anthraquinonyl, phenanthryl, anthracenyl, pyrenyl, perylenyl, and fluorenyl.

The term "alkylene" refers to a divalent group that is a radical of an alkane. The alkylene can be straight-chained, branched, cyclic, or combinations thereof. The alkylene often has 1 to 20 carbon atoms. In some embodiments, the alkylene contains 1 to 18, 1 to 12, 1 to 10, 1 to 8, 1 to 6, or 1 to 4 carbon atoms. The radical centers of the alkylene can be on the same carbon atom (i.e., an alkylidene) or on different carbon atoms. The alkylene group may also be substituted with one or more alkyl or aryl groups.

The term "arylene" refers to a divalent group that is carbocyclic and aromatic. The group has one to five rings that are connected, fused, or combinations thereof. The other rings can be aromatic, non-aromatic, or combinations thereof. In some embodiments, the arylene group has up to 5 rings, up to 4 rings, up to 3 rings, up to 2 rings, or one aromatic ring. For example, the arylene group can be phenylene. The arylene group may also be substituted with one or more alkyl or aryl groups.

The term "alkoxy" refers to a monovalent group of the formula —OR, where R is an alkyl group.

As used herein the terms "thermoplastic", "non-thermoplastic", and "thermoset", refer to properties of materials. Thermoplastic materials are materials which melt and/or flow upon the application of heat, resolidify upon cooling and again melt and/or flow upon the application of heat. The thermoplastic material undergoes only a physical change upon heating and cooling, no appreciable chemical change occurs. Non-thermoplastic materials are materials that do not flow upon the application of heat up to a temperature where the material begins to degrade. Thermoset materials, are curable materials that irreversibly cure, such as becoming crosslinked, when heated or cured. Once cured, the thermoset material will not appreciably melt or flow upon application of heat.

Disclosed herein are colored retroreflective articles and methods of preparing them. These methods comprise providing a polymeric carrier layer with a first major surface and a second major surface, depositing a barrier layer material in a predetermined pattern onto the first major surface of the carrier layer, providing transparent microsphere beads, partially embedding the transparent microsphere beads into the exposed portions of the first major surface of the polymeric carrier layer such that the beads at least partially protrude from the first major surface of the polymeric carrier layer to form a patterned layer comprising beaded and unbeaded regions, depositing a polymeric color layer on at least a portion of the beaded regions and at least a portion of the unbeaded regions, depositing a reflective layer on at least a portion of the polymeric color layer, depositing a bead bond layer on at least a portion of the reflective layer, removing the polymeric carrier layer.

Figure 1B:
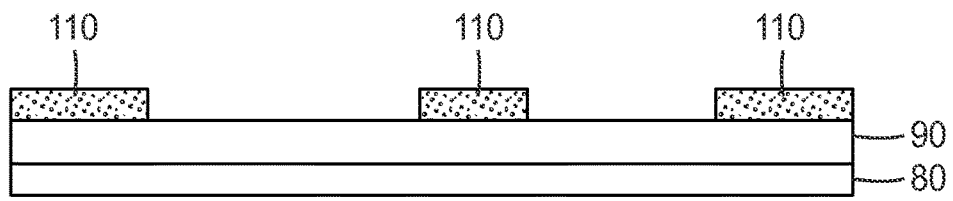
Figure 1C:
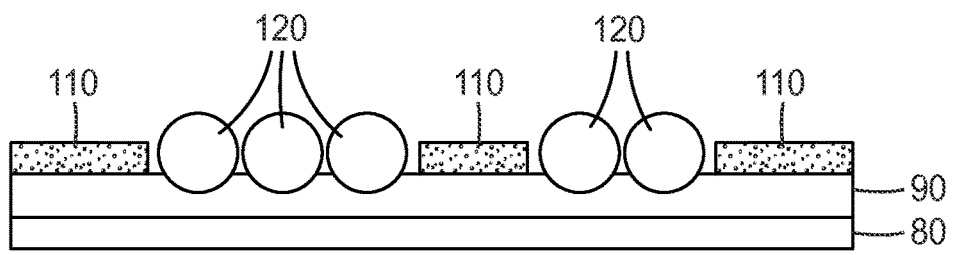
Figure 1D:
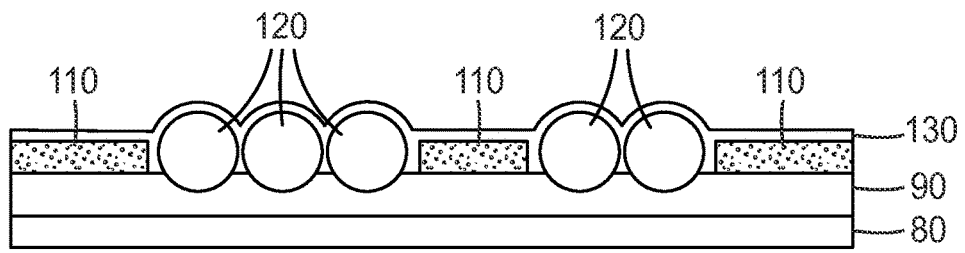
Figure 1E:
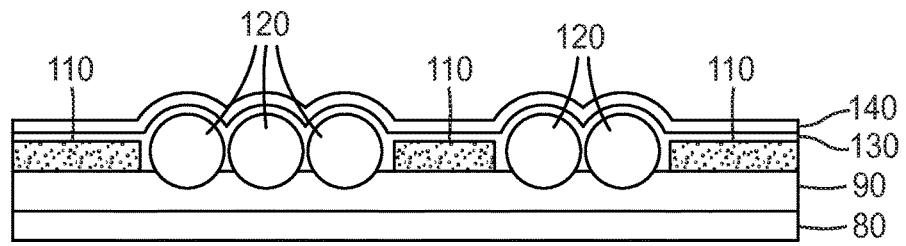
Figure 1F:
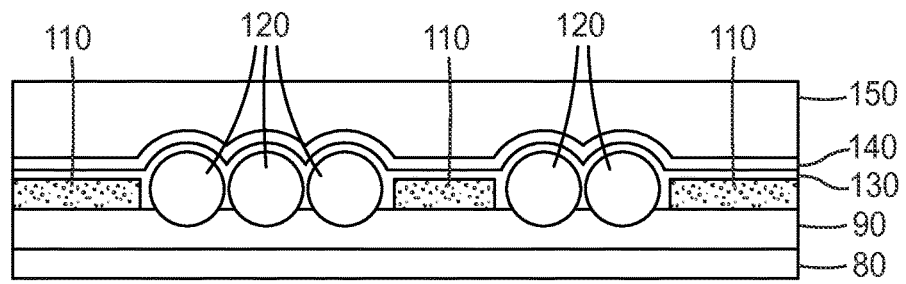
Figure 1G:
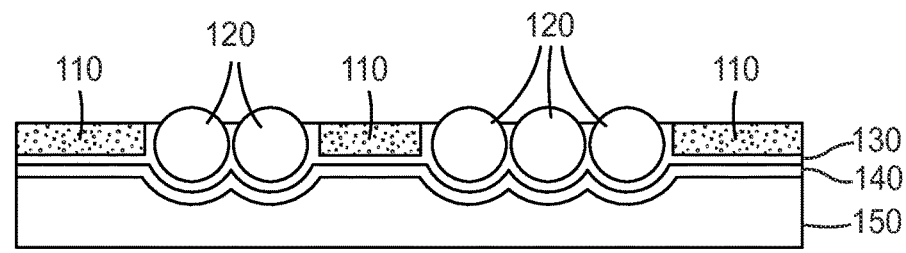
Figure 1H:
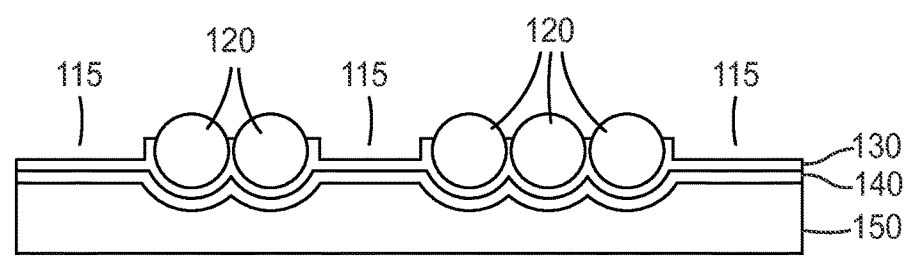

Examples of articles of this disclosure and how they are made are provided in the Figures. FIGS. 1*a* through 1*h* depict the steps of making an embodiment of an article of this disclosure. FIG. 1*a* depicts a polymeric carrier having a backing layer 80 and a thermoplastic layer 90. FIG. 1*b* further depicts a barrier layer material 110 covering portions of thermoplastic layer 90. FIG. 1c further depicts beads 120 partially embedded in thermoplastic layer 90 between barrier layer material 110. FIG. 1d further depicts polymeric color layer 130 covering barrier layer material 110 and beads 120. FIG. 1e further depicts reflective layer 140 covering polymeric color layer 130. FIG. 1f further depicts bead bond layer 150 covering reflective layer 140. FIG. 1g depicts the article after the polymeric carrier has been removed. FIG. 1h depicts an embodiment in which barrier layer material 110 is transient, but remains with the article, e.g., until the first washing, thereby creating cavities 115 where barrier layer material used to be located.

Figure 2A:
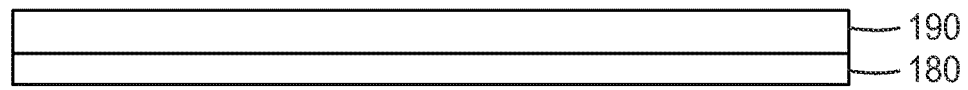
FIGS. 2a-2h show a method of making an embodiment of an article of this disclosure.
Figure 2B:
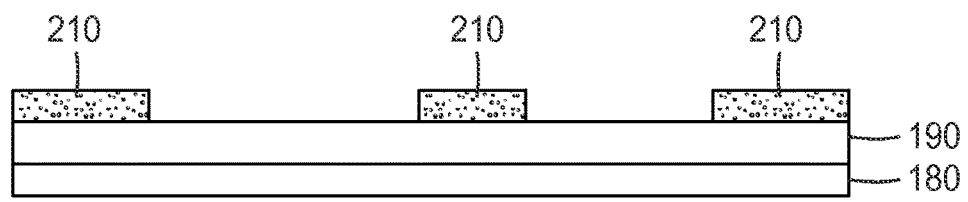
Figure 2C:
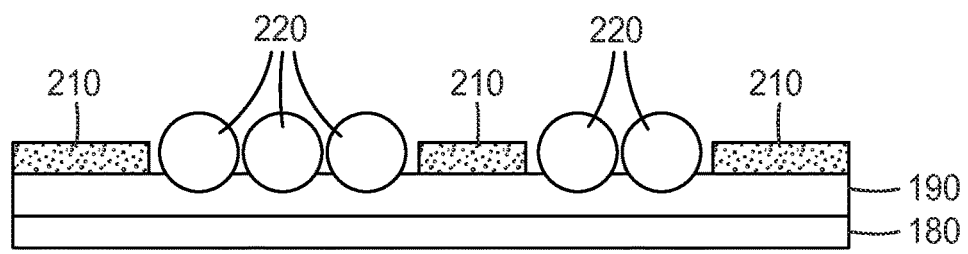
Figure 2D:
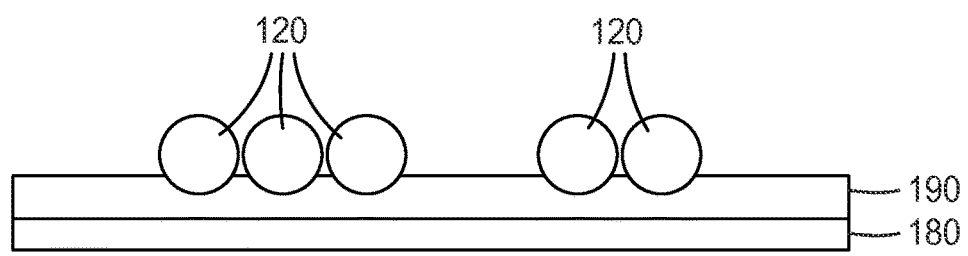
Figure 2E:
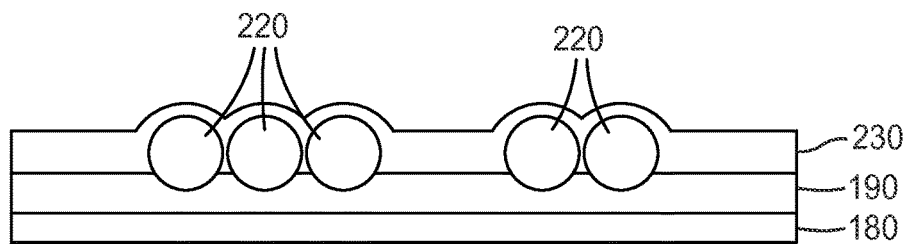
Figure 2F:
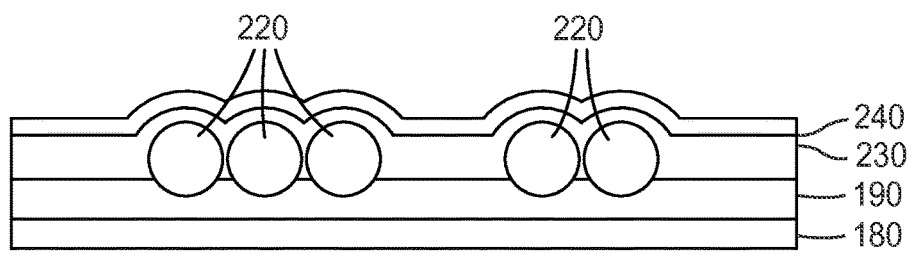
Figure 2G:
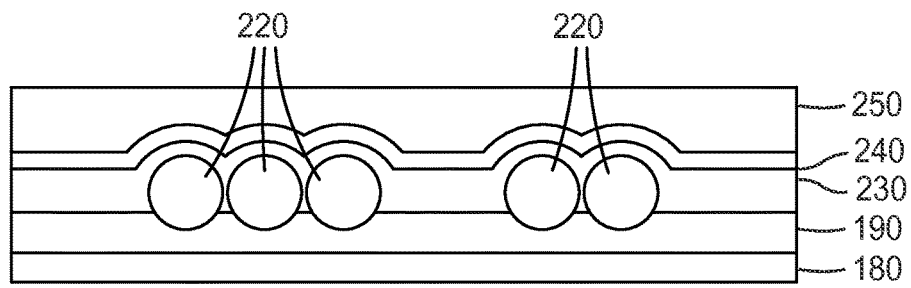
Figure 2H:
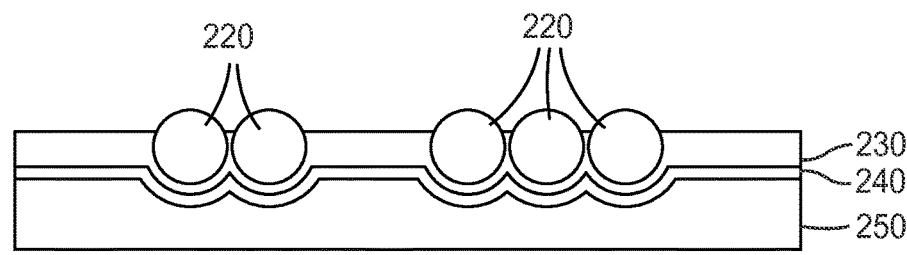

FIGS. 2a through 2h depict an alternate embodiment in which the barrier layer material is removed after the beads are applied to the polymeric carrier. FIG. 2a depicts a polymeric carrier having a backing layer 180 and a thermoplastic layer 190. FIG. 2b further depicts a barrier layer material 210 covering portions of thermoplastic layer 190. FIG. 2c further depicts beads 220 partially embedded in thermoplastic layer 190 between barrier layer material 210. FIG. 2d further depicts the removal of barrier layer material 210. FIG. 2e further depicts polymeric color layer 230 covering portions of thermoplastic layer 190 and beads 220. FIG. 2f further depicts reflective layer 240 covering polymeric color layer 230. FIG. 2g further depicts bead bond layer 250 covering reflective layer 240. FIG. 2h depicts the article after the polymeric carrier has been removed.

Figure 3:
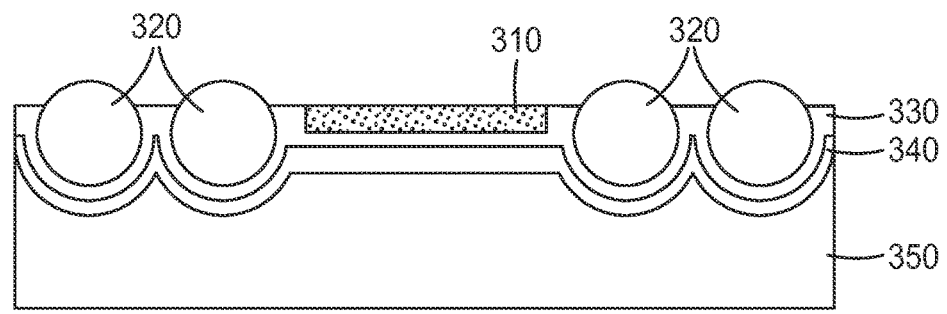
FIG. 3 shows a cross-sectional view of an embodiment of an article of this disclosure.

FIG. 3 is a cross sectional depiction of an embodiment of this disclosure. In FIG. 3, the retroreflective articles contains barrier layer material 310, beads 320, polymer layer 330 which contains a colorant, reflective layer 340, and bead bond layer 350.

Figure 4:
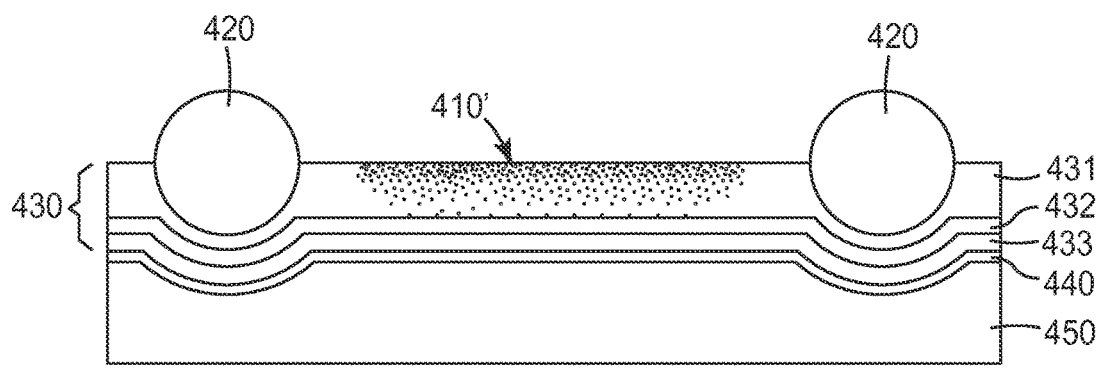
FIG. 4 shows a cross-sectional view of an embodiment of an article of this disclosure.

FIG. 4 depicts an alternative embodiment of this disclosure. In FIG. 4, the barrier layer material 410' is quasi-permanent and has interfused with one layer of multi-layer polymeric color layer 430 which comprises three sublayers 431, 432, and 433. In some embodiments, sublayer 433 contains the colorant and sublayer 431 contains at least one additive selected from UV stabilizers, antioxidants, UV absorbers, property modifiers, performance enhancers, or combinations thereof. In other embodiments, sublayer 433 contains the colorant and sublayer 431 is a clear polymeric color layer. Sublayer 432 may be clear or colored. The article also includes beads 420, reflective layer 440, and bead bond layer 450.

A wide variety of materials are suitable for use in the articles and methods described above.

Examples of these materials are included in the following description. Many materials and combinations of materials are suitable for the polymeric carrier layer. In many embodiments the polymeric carrier layer is a thermoplastic polymeric carrier layer, but in other embodiments the polymeric carrier layer may comprise an elastomeric polymeric carrier layer, and in some embodiments may even be a pressure sensitive adhesive or a heat activated adhesive. Typically the polymeric carrier layer comprises a thermoplastic polymeric carrier layer. In some embodiments, the thermoplastic polymeric carrier layer may be a standalone layer; in other embodiments the thermoplastic polymeric carrier layer may comprise a coating of thermoplastic polymeric carrier material on the first major surface of a sheet. The sheet may comprise, for example, paper, a polymeric film, and the like. Examples of useful polymeric carrier materials include polyvinyl chloride, polysulfones, polyalkylenes such as polyethylene, polypropylene and polybutylene, polyesters, and the like.

As previously described, a patterned barrier layer material is deposited on the surface of the polymeric carrier layer. The barrier layer may be deposited by any suitable method. Printing is typically the most preferred method. However, any discontinuous deposition method (e.g. needle die coating of stripes) can be used. A number of printing methods can be used to deposit the barrier layer, including contact printing, e.g. flexographic printing, gravure printing, ink jet printing, and screen printing.

In some embodiments, the barrier layer material is permanent and remains substantially intact and attached to the polymeric color layer (in the unbeaded region) in the finished retroreflective article. In other embodiments, the barrier layer material is quasi-permanent and interfuses with the polymeric color layer (at least in the unbeaded region) when the polymeric color layer is applied; thereby remaining, in a modified form, in the finished retroreflective article. In yet other embodiments, the barrier layer material is transient and is absent from, or removable from, the finished retroreflective article. A transient barrier layer may be removed prior to depositing the polymeric color layer. Alternatively, it may be removed from the finished retroreflective article.

The barrier layer material may be any suitable thickness as long as it prevents the polymeric carrier layer from contacting the beads. For example, in some embodiments the barrier layer material may be a surface monolayer, in some embodiments it may be about 10 nm to about 100 um thick, and in other embodiments it may have different thicknesses.

The barrier layer material is desirably a material that is physically and chemically "inert" with respect to the beads. In other words, it does not react with the beads, e.g., does not attract or attach to the beads or allow the beads to embed. Accordingly, the beads are typically unable to embed in the barrier layer or the portion of the polymeric carrier layer covered by the barrier layer. Preferably the barrier layer material does not soften when heat is applied to the polymeric carrier layer, which heat is applied to allow the beads to contact and/or embed in the carrier layer. This physical "inertness" of the barrier layer material may be achieved by, e.g., selecting materials that have a much higher softening temperature than the polymeric carrier layer material and/or loading the barrier layer material with particles or other additives that increase its "inertness." The addition of particles, pigments, and crosslinkers may increase the barrier layer's physical inertness. Chemical "inertness" of the barrier layer material may be achieved, e.g., with additives such as a slipping agent or a wax that prevent adhesion of the beads such as by providing a steric barrier of an adhesively-inert layer on the surface of the barrier layer. However, it should be noted that desirable retroflectivity and color quality can be achieved even if some beads embed in the barrier layer material.

The barrier layer material may be clear or colored. If the barrier layer material is clear, it will allow the color of the underlying (in the finished article) polymeric color layer to show through. If the barrier layer material is colored, it may be the same or different color as the underlying (in the finished article) polymeric color layer. A permanent or quasi-permanent barrier layer material can be the same color as the colored polymeric color layer to intensify the color of the final retro-reflective article. In some embodiments, the barrier layer material may comprise some or all of the same ingredients as the subsequently deposited polymeric color layer.

An ink may be used to form the barrier layer. "Ink" refers to a composition that is deposited as a liquid on a surface and solidifies to form a pre-determined pattern. The inks used to form barrier layer materials may be clear or colored. Suitable materials for a clear ink include wax, polyvinyl alcohol, polyurethane, polyacrylate, polysiloxane, latex, or any other material suitable as an ink. If the ink is colored, it may contain dyes or pigments, including nanopigments. Suitable materials for a colored ink include the same materials as for a clear ink with the addition of a colorant. Suitable colorants for the ink include the same colorants, e.g., dyes and pigments (including nanopigments) that are used in the polymeric color layer. Different additives can be used to improve ink stability, printability and/or the barrier "inert" function of the ink, such as surfactants, defoamers, pigments, inorganic particles or clusters such as silicate, calcium carbonate, clay, metal, metal oxide or other materials, and organic particles such as polysiloxane beads, polystyrene beads, PMMA beads and other materials.

Materials that may be used to form a permanent barrier layer include waxes, resins, polymeric materials, inks, inorganics, UV-curable polymers, and particles composed of either organic or inorganic metallic or non-metallic materials.

Materials that may be used to form a quasi-permanent barrier layer material include any composition or material that will interfuse with the polymeric color layer during the coating process of the polymeric color layer. For example, if the polymeric color layer solution is water-borne, any barrier material that is water soluble will be suitable, such as a barrier material comprising polyvinyl alcohol.

Materials that may be used to form a transient barrier layer material that is absent from the final article include those that can be chemically or physically dissolved and washed away, such as a photoresist. If the transient barrier layer is removed by a solvent after the beads are embedded in the carrier layer, but before the polymeric color layer is applied, any suitable solvent that does not affect the beads or polymeric carrier layer can be used. If the transient barrier layer is removed by a solvent after the polymeric color layer (and other layers) are added, the solvent may be any suitable solvent that does not affect any of the exposed layers. For example, the barrier layer may be removed during washing of the retro-reflective article. Alternatively, the transient barrier layer material may be any material that has higher adhesion to the polymeric carrier layer than to the final retroreflective article, and thus remains with the polymeric carrier layer when it is separated from the final retroreflective article.

The barrier layer material may be applied in any suitable pattern or shape, including regular and irregular shapes, linear and curved shapes, continuous and discontinuous patterns, random and repeating patterns, and combinations thereof. The regions containing barrier layer material may be large or small. The larger the areas of barrier layer material, the fewer microsphere beads in, and thus the lower the retroreflectivity of, the final article; at the same time, the more intense the color in the final article.

Figure 5:
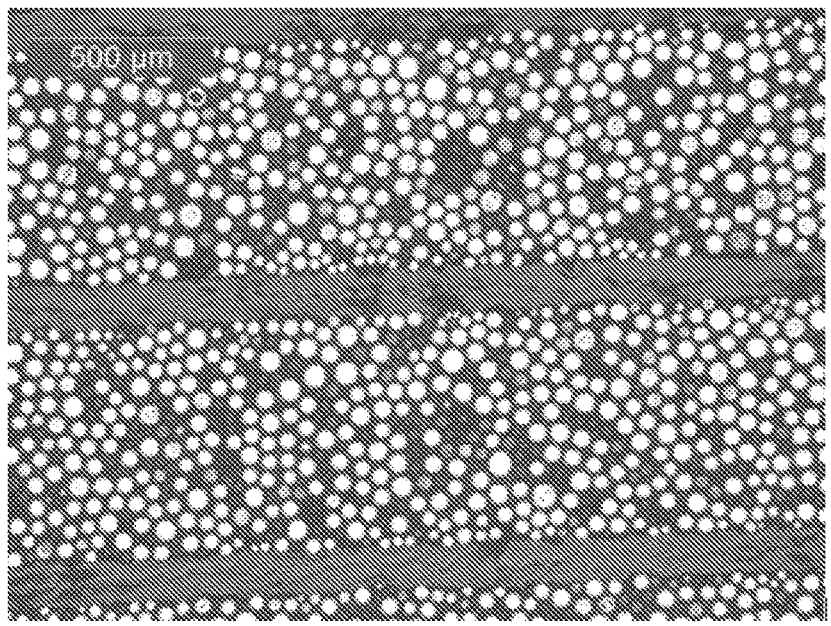
FIGS. 5-13 are optical micrographs of exemplary articles according to the present disclosure.
Figure 6:
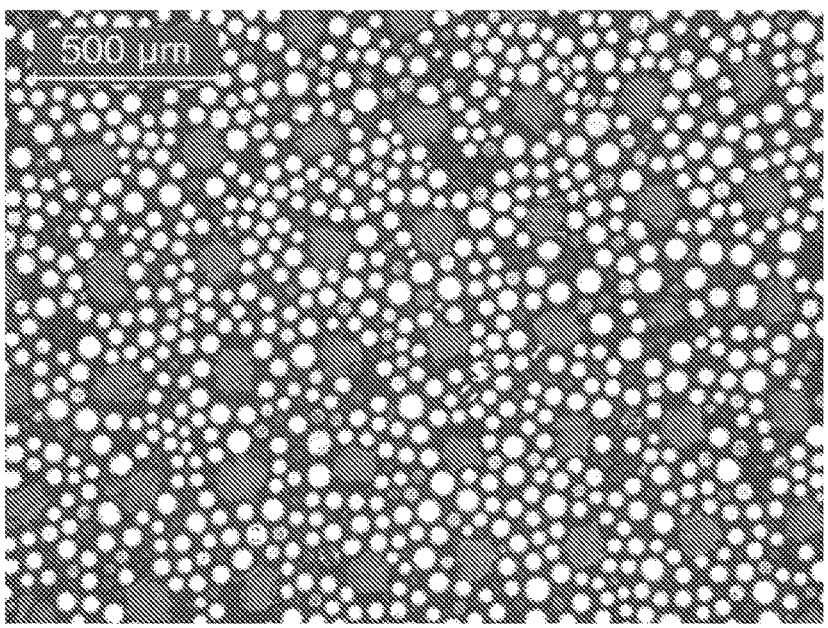
Figure 7:
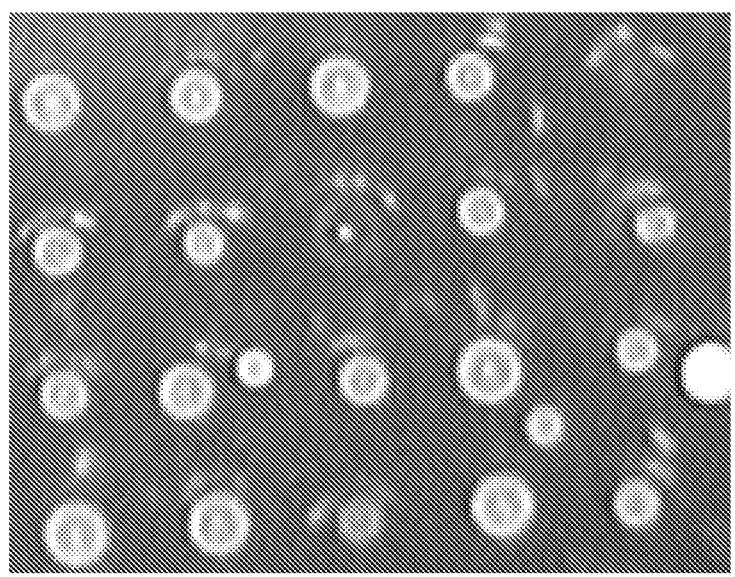
Figure 8:
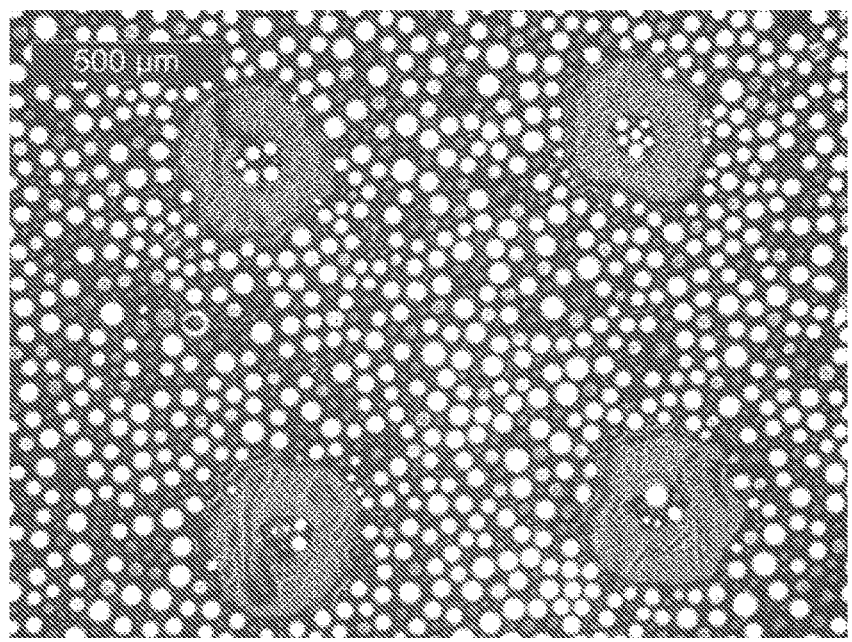
Figure 9:
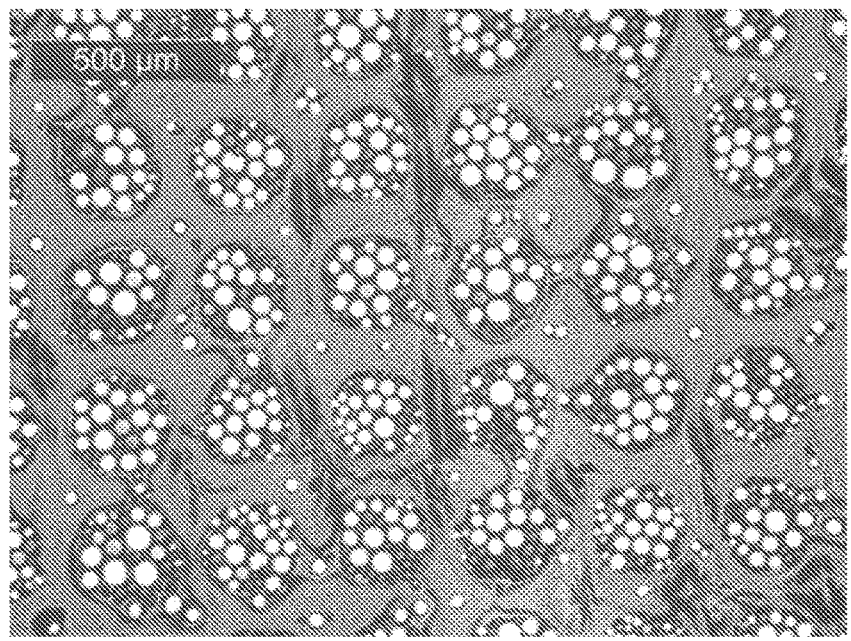
Figure 10:
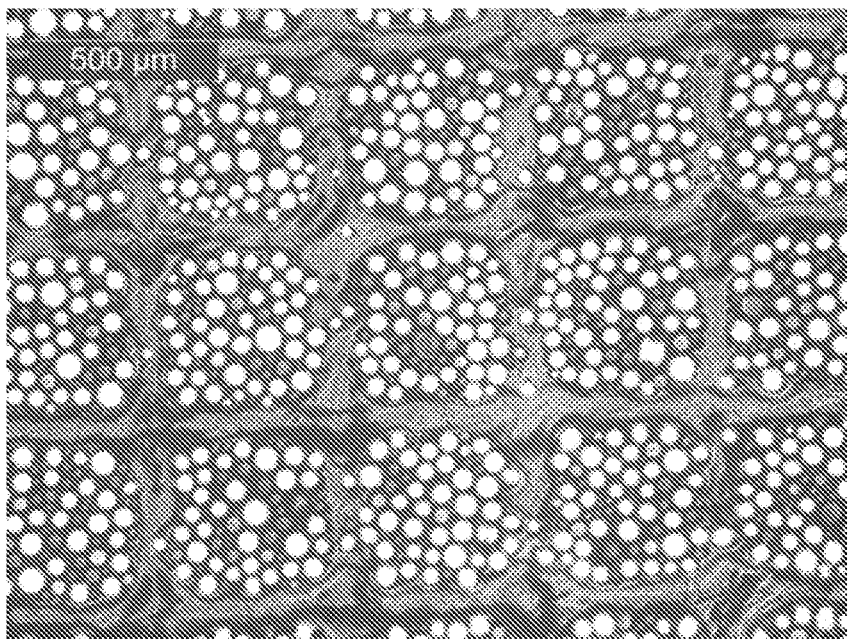
Figure 11:
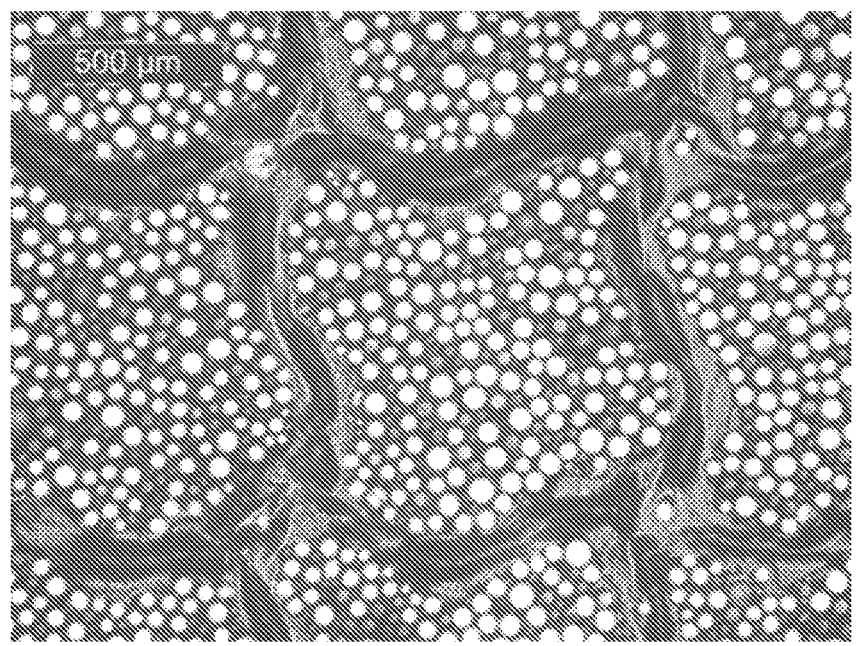
Figure 12:
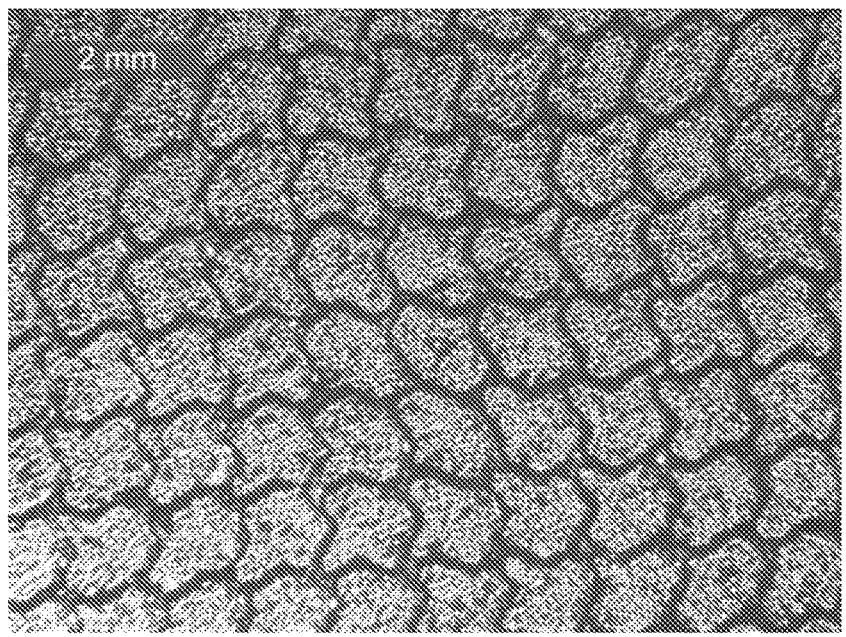
Figure 13:
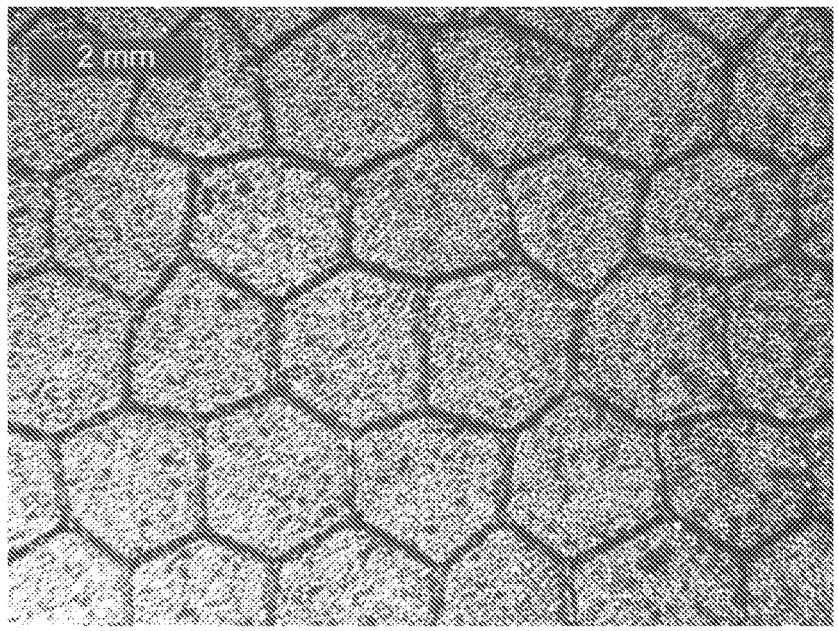

In some embodiments, the pre-determined patterns of the beaded and/or unbeaded regions may have repeating features such as lines, dots, squares, circles, chevrons, or any regular and irregular shapes, with the feature size and the spacing between features being determined according to the desired visual effect. In some embodiments, it is desirable to make the feature size and/or the spacing between features small enough so that the pre-determined patterns are not visible to the naked eye, e.g., the distinction between the beaded and unbeaded areas are not discernible. In such an embodiment, both high levels of retroreflectivity and color intensity can be achieved. FIGS. 5 to 13 show examples of patterns that may be used. FIG. 5 is an optical micrograph showing beads attached to a carrier layer other than in the regions occupied by a barrier layer material. The barrier layer material pattern of FIG. 5 comprises straight lines. FIG. 6 is an optical micrograph showing beads attached to a carrier layer other than in the regions occupied by a barrier layer material. The barrier layer material pattern of FIG. 6 comprises regularly spaced circles that have a diameter equal to the width of about two beads. FIG. 7 is an optical micrograph showing beads attached to a carrier layer other than in the regions occupied by a barrier layer material. The barrier layer material pattern of FIG. 7 comprises a substantially continuous coating of a barrier layer material with uncoated regions of the underlying carrier layer that are approximately the same diameter as a single bead. This barrier layer material pattern results in individual beads being uniformly spaced apart from each other. The upper right corner shows an uncoated region of the carrier layer which does not have a bead attached. FIG. 8 is an optical micrograph showing beads attached to a carrier layer other than in the regions occupied by a barrier layer material. The barrier layer material pattern of FIG. 8 comprises evenly spaced rings. FIG. 9 is an optical micrograph showing beads attached to a carrier layer other than in the regions occupied by a barrier layer material. The barrier layer material pattern of FIG. 9 comprises a substantially continuous grid-like coating of barrier layer material with uncoated circular-shaped regions. FIG. 10 is an optical micrograph showing beads attached to a carrier layer other than in the regions occupied by a barrier layer material. The barrier layer material pattern of FIG. 10 comprises a substantially continuous grid-like coating of barrier layer material with uncoated square-shaped regions. FIG. 11 is an optical micrograph showing beads attached to a carrier layer other than in the regions occupied by barrier layer material. The barrier layer material pattern of FIG. 11 comprises a substantially continuous chevron-shaped grid-like coating of barrier layer material with uncoated regions between. FIG. 12 is an optical micrograph showing beads attached to a carrier layer other than in the regions occupied by barrier layer material. The barrier layer material pattern of FIG. 12 comprises a substantially continuous chevron-shaped grid-like coating of barrier layer material with uncoated regions between. FIG. 13 is an optical micrograph showing beads attached to a carrier layer other than in the regions occupied by a barrier layer material. The barrier layer material pattern of FIG. 13 comprises a substantially continuous non-uniform hexagonal-shaped grid-like coating of barrier layer material with uncoated regions between.

In some embodiments, the barrier layer material is applied in a pattern that mimics, resembles, or otherwise matches or complements, at least in some respects, the pattern or texture of clothing apparel or other substrate to which the retroreflective article is applied. In such embodiments the described retroreflective articles may be incorporated into finished goods such as sports apparel, designer clothing and the like in a manner that is aesthetically pleasing. This pattern or texture matching can be accomplished, for example, by measuring typical repeat distances for a fabric pattern (viewed normal to the fabric surface) via optical microscopy, then specifying a barrier layer pattern with similar, or similarly proportioned, spacing. In at least some of these embodiments, along at least one direction, the pattern spacings of beaded and unbeaded regions in the retroreflective articles and the garment or substrate to which it is attached differ by less than 60%, preferably less than 40%, and more preferably less than 20%.

Pattern spacing in a direction within the plane of an article may be determined by calculating the average distance between the center points of correlating domains along an imaginary line across the sample in said direction. "Correlating domains" are those areas which have an identifying characteristic in common, whether it be the presence or absence of beads, shape, average dimension, as with the retroreflective articles of this disclosure, or the graphic print, embossing, texture, nap, thread direction, thread color, etc., as with a garment or other substrate, and which establish the periodicity or commonality of a repeating pattern and the randomness of a random pattern. It is to be recognized that evaluating pattern spacing has an intuitive, obvious component in that a pattern can be recognized despite typical variability in exact distance between corresponding pattern features.

Beads are partially embedded on the surface of the polymeric carrier layer in the regions not covered by the patterned barrier layer material. The layer of beads is assembled by cascading beads onto the polymeric carrier layer, which secures the microsphere beads in a desired temporary assignment. Typically, the polymeric carrier layer is heat softened. The microsphere beads are generally packed as closely as possible, ideally in their closest hexagonal arrangement, to achieve very good retroreflective brightness and may be so arranged by any convenient application process, such as printing, screening, cascading, or hot rolling. Upon cooling, the polymeric carrier layer retains the microsphere beads in a desired arrangement.

Typically, the beads are substantially spherical in shape in order to provide the most uniform and efficient retroreflection. The microsphere beads are substantially transparent so as to minimize absorption of light so that a large percentage of the incident light is retroreflected. The microsphere beads often are substantially colorless but may be tinted or colored in some other fashion.

The microsphere beads may be made from glass, a non-vitreous ceramic composition, or a synthetic resin. Glass and ceramic microspheric beads are particularly suitable because they tend to be harder and more durable than microsphere beads made from synthetic resins. Examples of microsphere beads that may be used are described in the following U.S. Pat. Nos. 1,175,224, 2,461,011, 2,726,161, 2,842,446, 2,853,393, 2,870,030, 2,939,797, 2,965,921, 2,992,122, 3,468,681, 3,946,130, 4,192,576, 4,367,919, 4,564,556, 4,758,469, 4,772,511, and 4,931,414.

The polymeric color layer typically comprises at least one polymer and at least one colorant. In some embodiments, the colorant comprises a fluorescent colorant. In some embodiments, the colorant comprises a dark color such as black, cyan, or magenta or a light color such as white.

The polymeric color layer may be a single layer or a multi-layer construction. When the polymeric color layer is a multi-layer construction, at least one layer is colored with a colorant. Additional layers may also be colored, but it is not necessary that all layers be colored. In some embodiments, at least one of the layers of the multi-layer construction comprises a polymeric color layer comprising at least one additive selected from UV stabilizers, antioxidants, UV absorbers, tinting agent, property modifiers, performance enhancers, or combinations thereof. It is desirable that this layer, which contains stabilizing additives, is located between the polymeric color layer containing colored pigment or dye and the environment, such that it protects the polymeric color layer containing colored pigment or dye from UV degradation, degradation due to laundering, and the like. Thus the polymeric layer comprising at least one additive selected from UV stabilizers, antioxidants, UV absorbers, tinting agent, property modifiers, performance enhancers, or combinations thereof is located between the surface of the transparent microsphere and the polymeric color layer colored with at least one colorant. In addition the multi-layer polymeric construction may contain additional layers, either colored or transparent and optionally containing one or more of the additives described above.

In other embodiments containing a multi-layer polymer construction, the multi-layer polymer construction may comprise a clear polymeric layer. By clear polymeric layer, it is meant a polymeric layer that is optically transparent or optically clear. This polymeric layer can be located between the colored layer and the environment, such that it protects the colored layer from degradation from exposure to the environment. The clear polymeric layer can also be located between a polymeric color layer and the reflective layer as described later. In addition, the multi-layer polymeric construction may contain additional layers, either colored or transparent and optionally containing one or more of the additives described above.

The polymeric color layer includes a colorant. A colorant can be any material that is capable of changing the color of reflected or transmitted light as the result of wavelength-selective adsorption. Any colorant can be utilized in retroreflective articles as disclosed herein. In some embodiments, the colorant can be a nanopigment. A nanopigment is a pigment that generally has an average particle size in the nanometer range. In some embodiments, a colorant can have an average particle size from about 1 nm to about 1000 nm. Nanopigments can be useful because of the interaction of light with them; light will diffract from nanopigments because of their size, which can contribute to high reflectivities. In some embodiments, a nanopigment can have an average particle size from about 20 nm to about 500 nm. An exemplary nanopigment that can be utilized includes CABOJET 300, which is commercially available from Cabot Corporation (Boston, Mass.).

In some embodiments, the polymeric color layer can include both nanopigments and other sized pigments (which can be referred to herein as "normal pigments"). In some embodiments that include both nanopigments and normal pigments, the nanopigments can account for at least about 5 percent of the total pigment by weight. In some embodiments that include both nanopigments and normal pigments, the nanopigments can account for at least about 10 percent of the total pigment by weight. In some embodiments, the colored layer includes both pigments and dyes, such as both nanopigments and dyes for example.

The polymeric color layer generally includes a desirable amount of colorant to provide a desired color or depth of color to the colored layer or the finished retroreflective article. The amount of colorant in the polymeric color layer can depend at least in part on the particular colorant(s) utilized, the desired color or shade of color, the other components in the polymeric color layer, and combinations thereof. In some embodiments, the polymeric color layer can have 0.1 to 80 percent pigment, by weight of solids in the colored layer; from 1 to 60 percent pigment, by weight of solids in the colored layer; or from 5 to 40 percent pigment, by weight of solids in the colored layer.

As mentioned above, the polymeric color layer may contain colorants such as dyes, pigments or a combination of dyes and pigments. Examples of dyes and pigments that may be used to color the polymeric color layer include:

DUPONT TI-PURE R-960 from E.I. du Pont de Nemours and Company, Wilmington, Del.; AURASPERSE II Red 2030, AURASPERSE II blue 15:3, AURASPERSE II yellow 1100, XFAST Orange 2930, XFAST Yellow 1102, SUDAN YELLOW 146, SUDAN YELLOW 150, SUDAN RED 290, and SUDAN BLUE 35 from BASF, Corporation, Clifton, N.J.; CAB-O-JET 200, CAB-O-JET 300, CAB-O-JET 352k from Cabot Corporation, Boston, Mass.; 275-0570 (Pigment Yellow 83) and 275-0023 (Pigment Yellow 17) from Sun Chemical, Cincinnati, Ohio.

In some embodiments, the colorant is a highly visible fluorescent dye and/or pigment. Fluorescent dyes and/or pigments can provide enhanced conspicuity under daytime lighting conditions. Examples of fluorescent dyes or pigments that may be used to color the polymeric color layer, include: DAY-GLO FIRE ORANGE T-14, ROCKET RED GT, BLAZE ORANGE GT, and SATURN YELLOW T-17, from Day-Glo Color Corp., Cleveland, Ohio; FLARE 911 from Cleveland Pigment & Color Co., Akron, Ohio; LUMOGEN F RED 300, F YELLOW 083, and YELLOW S0790 (PIGMENT YELLOW 101, C.I. No. 48052), BASF Corporation, Clifton, N.J.

A wide variety of polymers are suitable for use in the polymeric color layer of this disclosure. Generally, polymeric materials such as those described below for the bead bond layer can be utilized. Specific exemplary polyurethane forming methods (into which pigments can be incorporated) are described in U.S. Pat. Nos. 5,645,938 and 6,416,856 (Crandall) and PCT Publication No. WO 96/16343, and in U.S. Pat. No. 5,976,669 (Fleming), and PCT Publication No. WO 98/28642. In some embodiments, polyester polyurethanes, polyether polyurethanes, polycarbonate polyurethanes, or polyurethanes that include a block copolymer of polyether and polyester units can be utilized. A class of commercially available polyurethane materials that can be utilized are BAYHYDROL polyurethane dispersions that are available from Bayer AG (Leverkusen, Germany).

The polymeric color layer can be any suitable thickness. The polymeric color layer preferably fills any gaps or openings between adjacent beads and forms a thin, but at least substantially continuous layer over the microsphere beads. In at least some embodiments, the thickness of the polymeric color layer between adjacent beads is about 1 um to about 100 um.

The thickness and thickness uniformity of the polymer color layer strongly affects both the color and retroreflectivity of the colored retroreflective article. US Patent Publication No. 2011/0292508, (Huang et al.) discloses a method for making colored retroreflective articles by depositing a colored composition on to the exposed surface of optical elements that are partially embedded into a carrier layer, then depositing a reflective layer. The colored composition is designed such that during the drying of the colored composition, less of the colored composition remains on top of the optical elements. The colored composition flows down the exposed surfaces of the beads and filling the volume between the optical elements and the carrier web in which they are embedded. A thick colored composition that remains on the top surfaces of the optical elements can interfere somewhat with the effect of the reflective layer that is next coated on the optical elements, and thus decrease the retroreflectivity of the article.

This can be particularly deleterious for applications such as high visibility safety garments which require high retroreflectivity and proscribe minimum retroreflectivity coefficients at a wide range of entrance angles (see, for example, high visibility clothing test method and requirements standards such as ANSI/ISEA 107/2010 or ISO 20471:2013).

The reflective layer may comprise a reflective metal layer or a dielectric reflective layer. The reflective metal layer is a specularly reflective metal that forms a reflective metal layer coating. This technique facilitates the arrangement of the retroreflective elements (optical elements and reflective material) in substantially uniform direction for retroreflection. The size of the retroreflective elements, i.e., the surface portion of the microsphere beads covered with the reflective material, may be controlled in part by controlling the depth to which the microsphere beads are embedded in the polymer prior to applying the reflective material.

The reflective material can be a layer comprising an elemental metal that is capable of specularly reflecting light. A variety of metals may be used to provide a specular reflective metal layer. These include aluminum, silver, chromium, gold, nickel, magnesium, and the like, in elemental form, and combinations thereof. Aluminum and silver are particularly suitable metals for use in a reflective layer from a performance standpoint. The metal may be a continuous coating such as is produced by vacuum-deposition, vapor coating, chemical-deposition, or electroless plating. It is to be understood that in the case of aluminum, some of the metal may be in the form of the metal oxide and/or hydroxide. Aluminum and silver metals are desirable because they tend to provide the highest retroreflective brightness. In some embodiments, silver metal is particularly desirable. The metal layer should be thick enough to reflect incoming light. Typically, the reflective metal layer is about 50 to 150 nanometers thick.

When the reflective layer is a dielectric reflective layer, the dielectric reflective layer is a dielectric mirror. The dielectric mirror may be similar to known dielectric mirrors disclosed in U.S. Pat. Nos. 3,700,305 and 4,763,985 to Bingham. The dielectric mirrors typically are multi-layer constructions, with a layer having a refractive index $n_2$ and a layer of transparent material disposed thereon which has a refractive index $n_1$, and the opposite face of the transparent material (having a refractive index $n_1$) is in contact with a material having a refractive index $n_3$, where both $n_2$ and $n_3$ have a refractive index of at least 0.1, more typically at least 0.3, higher or lower than $n_1$. The transparent material is a layer that typically has an optical thickness corresponding to odd numbered multiples (that is, 1, 3, 5, 7 . . . ) of about one-quarter wavelength of light in the wavelength range of about 380 to about 1,000 nanometers. Thus, either $n_2 > n_1 < n_3$ or $n_2 < n_1 > n_3$, and the materials on either side of the transparent layer may be either both higher or both lower in refractive index than $n_1$. When $n_1$ is higher than both $n_2$ and $n_3$, $n_1$ is in the 1.7 to 4.9 range, and $n_2$ and $n_3$ are in the 1.2 to 1.7 range. Conversely, when $n_1$ is lower than both $n_2$ and $n_3$, $n_1$ is in the 1.2 to 1.7 range, and $n_2$ and $n_3$ are in the 1.7 to 4.9 range. The dielectric mirror generally comprises a contiguous array of materials, at least one being in layer form, having an alternating sequence of refractive indices. Typically, the contiguous array has from two to seven layers, more typically three to five layers, adjacent to the lens element. A dielectric mirror can provide very good retroreflectivity, although, it typically is not as efficient a reflector as a reflective metal layer.

Among the many compounds that may be used in providing transparent materials within the desired refractive index range are: high index materials such as CdS, $CeO_2$, CsI, GaAs, Ge, InAs, InP, InSb, $ZrO_2$, $Bi_2O_3$, ZnSe, ZnS, $WO_3$, PbS, PbSe, PbTe, RbI, Si, $Ta_2O_5$, Te, $TiO_2$; low index materials such as $Al_2O_3$, $AlF_3$, $CaF_2$, $CeF_3$, LiF, $MgF_2$, $Na_3$ AlF$_6$, ThOF$_2$, elastomeric copolymers of perfluoropropylene and vinylidene fluoride (refractive index of >>1.38), etc. Other materials are reported in Thin Film Phenomena, K. L. Chopra, page 750, McGraw-Hill Book Company, N.Y., (1969). Particularly suitable dielectric mirrors contain layers of SiO$_2$, CaF$_2$, MgF$_2$, ZnS, Nb$_2$O$_5$, Ta$_2$O$_5$, or combinations thereof. In some embodiments, the dielectric reflective layer comprises a layer of CaF$_2$, ZnS, or a combination thereof.

The bead bond layer contains at least one polymer (typically called a binder material) and may contain additional additives such as a colorant or other optional additives such as UV stabilizers, antioxidants, UV absorbers, property modifiers, performance enhancers, or combinations thereof. Any of the colorants described above (nanopigments, dyes, and pigments) are suitable for use in the bead bond layer.

The polymeric binder material of the bead bond layer may be a polymer including, but not limited to, an elastomer. In this disclosure, an elastomer is defined as a polymer having an ability to be stretched to at least twice its original length and to retract to approximately its original length when released, (definition taken from "Hawley's Condensed Chemical Dictionary", R. J. Lewis Sr. Ed., 12th Ed., Van Nostrand Reinhold Co., New York, N.Y. (1993)). Typically, the polymeric binder material includes a cross-linked or virtually cross-linked elastomer. A cross-linked elastomer means that the polymeric chains of the elastomer are chemically cross-linked to form a three dimensional network which is stabilized against molecular flow. A virtually cross-linked elastomer means that the polymeric chain mobility of the elastomer is greatly reduced by chain entanglement and/or by hydrogen bonding, resulting in an increase in the cohesive or internal strength of the polymer. Examples of such polymer cross-linking include carbon-carbon bond formation such as: free radical bonding between vinyl groups between chains; agent or group coupling such as by vulcanization or reaction with a coupling agent such as a diol in the case of isocyanate or epoxy functionalized polymers; a diisocyanate or an activated ester in the case of amine and alcohol functionalized polymers; and epoxides and diols in the case of carboxylic acid or anhydride functionalized polymers. Examples of such virtual cross-linking include amide hydrogen bonding as is found in polyamides or crystalline and amorphous region interactions as is found in block copolymers of styrene and acrylonitrile.

Illustrative examples of the polymers that may be employed as the binder material in the bead bond layer include: polyolefins; polyesters; polyurethanes; polyepoxides; natural and synthetic rubbers; and combinations thereof. Examples of cross-linked polymers include the foregoing examples of polymers substituted with cross-linkable groups such as epoxide groups, olefinic groups, isocyanate groups, alcohol groups, amine groups or anhydride groups. Multifunctional monomers and oligomers which react with functional groups of the polymers may also be used as cross-linkers.

Specific examples of useful bead bond layer materials are disclosed in U.S. Pat. Nos. 5,200,262 and 5,283,101. In the '262 patent, the bead bond layer comprises one or more flexible polymers having active hydrogen functionalities such as crosslinked urethane-based polymers (for example, isocyanate cured polyesters or one of two component polyurethanes) and one or more isocyanate-functional silane coupling agents. In the '101 patent, the bead bond layer comprises an electron-beam cured polymer selected from the group consisting of chlorosulfonated polyethylenes, ethylene copolymers comprising at least about 70 weight percent polyethylene, and poly(ethylene-co-propylene-co-diene) polymers.

Examples of commercially-available polymers that may be used in the bead bond layer include the following: VITEL VPE 3550B and VPE 5833 polyesters available from Bostik, Wauwatosa, Wis.; RHOPLEX HA-8 and NW-1845 acrylic resins available from Dow Chemical; CYDROTHANE a polyurethane available from Cytec Industries, West Patterson, N.J.; ESTANE 5703 and 5715 available from Lubrizol Corporation, Cleveland, Ohio; and NIPOL 1000, available from Zeon Chemicals, Inc., Rolling Meadows, Ill.

The bond layer typically has a thickness of about 50 to 250 micrometers (2 to 10 mils), with thicknesses of about 75 to 200 micrometers (3 to 8 mils) often being particularly suitable. It is to be understood that a bead bond layer having a thickness outside these ranges may be used; however, if the bead bond layer is too thin, it may not provide sufficient support to the microsphere beads, allowing them to become dislodged.

If colored, the bead bond layer generally includes a desirable amount of colorant to provide supplemental color or depth of color of the polymeric color layer or article. The amount of colorant in the polymeric color layer can depend at least in part on the particular colorant(s) used, the desired color or shade of color, the other components in the polymeric color layer, and combinations thereof.

In some embodiments, it is desirable that the retroreflective articles have at least a portion of the surface of the article be discontinuous. By discontinuous it is meant that there is a region in the finished retroreflective article that is devoid of all layers from the microsphere bead and barrier material layer and to the bead bond layer. These discontinuities can be beneficial for a variety of reasons. In some embodiments, the discontinuities can form a pattern or design. The pattern or design can be in the form of indicia, logos, etc. In other embodiments, the discontinuities can be arranged either randomly or in a non-continuous pattern. Besides the visual effect of the discontinuities, the discontinuities can provide enhanced breathability for the retroreflective article. By this it is meant that gases, and or moisture can pass through the retroreflective article more easily. An effect of the enhanced breathability is to be more comfortable for a person wearing such an article. This is particularly desirable for construction workers, firefighters, emergency workers, and people exercising.

Retroreflective articles with discontinuous segments can be prepared a variety of different ways. A particularly suitable way involves partially removing optical elements and bead bond layer from portions of one or more segments. This removal can be effected by cutting, scraping, hole-punching, and other suitable mechanical means.

Also disclosed herein are articles of clothing that contain retroreflective appliqués of the disclosure. These articles of clothing comprise a fabric with a first major surface and a second major surface, and a retroreflective appliqué attached to the first major surface of the fabric. The retroreflective appliqué is the retroreflective article described above. A wide variety of fabrics are suitable.

Transfer film retroreflective appliqués and fixed retroreflective appliqué can be attached to the fabric surface by a wide range of attachment techniques such as mechanical attachment or adhesive attachment. Examples of mechanical attachment techniques include, for example, sewing and heat lamination. In adhesive attachment, an adhesive can be applied to the bead bond layer or a backing layer can be applied to the bead bond layer and an adhesive layer applied to the backing layer.

Examples of suitable adhesive layers include pressure sensitive adhesives, heat activated adhesives, and laminating adhesives. The adhesive layer may be applied to the bead bond layer or backing layer by coating or by lamination of a formed adhesive layer to the bead bond layer or backing layer.

A wide variety of pressure sensitive adhesives are suitable including tackified natural rubbers, synthetic rubbers, tackified styrene block copolymers, polyvinyl ethers, poly (meth) acrylates, polyurethanes, polyureas, poly-alpha-olefins, and silicones. The pressure sensitive adhesive may be covered with a release liner to protect the adhesive prior to adhesion to a substrate.

Heat activated adhesives are very similar to pressure sensitive adhesives but require the application of heat to become tacky. One advantage of heat activated adhesives is that, because they are not tacky at room temperature, they typically do not require a release liner to protect the adhesive layer prior to adhesion to a substrate.

Typically, if a laminating adhesive is used, the adhesive layer is immediately bonded to a substrate to form the adhesive substrate bond. Examples of laminating adhesives include hot melt adhesives, adhesive dispersions and suspensions, and curing adhesives such as cyanoacrylates.

A wide variety of articles of clothing are suitable for attachment of retroreflective appliqués. Examples of such articles of clothing include, for example, vests such as the safety vests frequently worn by road construction workers, but also include a wide range of other clothing types. Examples include, shirts, sweaters, jackets, coats, pants, shorts, socks, shoes, gloves, belts, hats, suits, one-piece body garments, and the like.

EXAMPLES

These examples are merely for illustrative purposes only and are not meant to be limiting on the scope of the appended claims. All parts, percentages, ratios, etc. in the examples and the rest of the specification are by weight, unless noted otherwise. Solvents and other reagents used were obtained from Sigma-Aldrich Chemical Company; Milwaukee, Wis. unless otherwise noted. The following abbreviations are used: nm=nanometers; um=micrometers; mPa=milliPascals; psi=pounds per square inch; MPa=MegaPascals; min=minutes; mm=millimeters; ft=foot, fpm=feet per minute; m/min=meters per minute; BCM=Billion Cubic Microns per square inch; ° F.=degrees Fahrenheit; ° C.=degrees Celsius, in=inch; LW=line width. The terms "weight %", "% by weight", and "wt %" are used interchangeably.

Table of Abbreviations

| Abbreviation or Trade Designation | Description |
| --- | --- |
| Colorant-1 | Carbon Lamp Black Pigment, commercially available from Fisher Scientific Corporation, Pittsburgh, PA. |
| Ink-1 | Black printing ink, commercially available as "HMC ACE BW8 Mixing Black" from Flint Group, Arden, NC. |
| Ink-2 | Clear printing ink, commercially available as "HMC ACE Transparent White Extender" from Flint Group, Arden, NC. |
| PVA-1 | 80% hydrolyzed, 9000-10000 MW polyvinyl alcohol, commercially available from Sigma Aldrich. |
| Surf-1 | Surfactant, commercially available as "Tergitol-15-S-7" from Dow Chemical, Midland, MI. |
| Colorant-2 | Black particulate pigment, commercially available as "Cab-O-Jet 352 K" from Cabot Corporation, Boston, MA. |
| PUD-1 | Polyurethane dispersion, commercially available as "Impranil-DLC-F" from Bayer Corp. Pittsburgh, PA. |
| Silane-1 | Commercially available as "DYNASYLAN 1122" from Evonik Industries, Overland Park, KS. |
| Colorant-3 | Commercially available as "GT-17-N SATURN YELLOW PIGMENT" from Day-Glo Color Corp., Cleveland, OH. |
| PUD-2 | Polyurethane dispersion, commercially available as "SANCURE 835" from Lubrizol Advanced Materials, Cleveland, OH. |
| PI-1 | Polyisocyanate-1, an aliphatic polyisocyanate commercially available as "DESMODUR XP 2838" from Bayer, Pittsburgh, PA. |
| Silane-2 | Commercially available as "SILQUEST A 189" from Momentive Performance Materials, Strongsville, OH. |
| Cat-1 | Catalyst-1, polyurethane catalyst commercially available as "BICAT 8108" from Shepherd Chemical Company, Norwood, OH. |
| PE-1 | Polyester resin commercially available as "VITEL 3550 B" from Bostik Company, Wauwatosa, WI. |
| PE-2 | A polyester resin commercially available as "VITEL 5833" from Bostik Company, Wauwatosa, WI. |
| Polyol1 | A polycarbonate diol "Kuraray C 2090" available from Kuraray America Inc. Houston, TX |
| Silane-3 | Commercially available as "SILQUEST A 1310" from Momentive Performance Materials, Strongsville, OH. |
| PI-2 | Polyisocyanate-2, an aromatic polyisocyanate commercially available as "DESMODUR L 75" from Bayer, Pittsburgh, PA. |
| Cat-2 | Dibutyl tin dilaurate, (DBTDL), polyurethane catalyst. |
| MIBK | Methyl isobutyl ketone solvent |
| EA | Ethyl acetate solvent |
| MEK | Methy ethyl ketone solvent |
| DEG | Diethylene Glycol monoethyl ether solvent |

-continued

| Table of Abbreviations | |
|---|---|
| Abbreviation or Trade Designation | Description |
| DAA | Diacetone Alcohol solvent |
| FR-1 | Flame Retardant-1, brominated flame retardant, commercially available as "SAYTEX 102E", Albemarle Corp., Baton Rouge, LA. |
| TPU-1 | Thermoplastic Polyurethane, commercially available as "ESTANE 5703" from Lubrizol, Cleveland, OH. |
| Ox-1 | Antimony Oxide |
| Ox-2 | Titanium Oxide |

Test Methods

Retroreflectivity Measurement

Retroreflectivity was measured using the test criteria described in ASTM E810-03 (2013)—Standard Test Method for Coefficient of Retroreflective Sheeting using the Coplanar Geometry. Retroreflective units are reported in cd/lux/m².

Color Measurement

Color (expressed as either Yxy, or L*a*b*) was measured according to the procedure outlined in ASTM E 308-90, where the following operating parameters are as set forth below:

Standard illuminant: D65 daylight illuminant
Standard observer: CIE (International Commissioner of Illumination) 1931 2°
Wavelength interval: 400-700 nanometers at 10 nanometer intervals
Incident light: 0° on sample plane
Viewing: 45° through a ring of 16 fiber optic receptor stations
Area of view: one inch
Port size: one inch Knowing these parameters, a person of ordinary skill can reproduce this test. For a further discussion of the operating parameters see ASTM E 1164-93.

Examples 1 Through 17 and Comparative Examples 1 and 2

For Example 1, a 40 cm wide carrier web comprising a paper sheet coated with a heat-softenable layer of polyethylene was printed using a PVA-based aqueous ink with the composition listed in Table 1 with a desktop flexographic printer with a Dupont 0.067 DPR HD stamp (Southern Graphics Systems, Brooklyn Park, Minn.). Print conditions consisted of the following: the carrier web was printed using a 10 BCM/in² anilox roll at 32.8 fpm (10 m/min), dried in a batch oven for 2 min set to 212° F. (100° C.). The printing pattern consisted of 62.5 micrometer wide lines with a 355 micrometer pitch. Comparative Example 1 was made using a non-printed carrier web.

TABLE 1

| Ingredient | Weight |
|---|---|
| PVA-1 | 9.9 |
| Colorant-1 | 0.99 |
| DI Water | 88.12 |
| Surf-1 | 0.99 |

For Examples 2 through 17 a 40 cm wide carrier web comprising a paper sheet coated with a layer of polyethylene was printed with Ink-1. The ink was flexographically printed onto the polyethylene surface with a Dupont 0.067 DPR HD stamp (Southern Graphics Systems, Brooklyn Park, MN) under the following conditions: a 4.0 BCM/in² anilox roll, 60 fpm line speed, and dried using two 2 foot-long ovens set to 175° F. (80° C.) oven temperature, under air corona at 3.8 Joules/in². Various printing patterns in the stamp are described in Table 5; Comparative Examples 1 and 2 were made using a non-printed carrier web.

For Examples 1 through 17 and Comparative Examples 1 and 2, a sheet of paper-backed polyethylene carrier web as described above was heated in a box oven to approximately 230° F. (110° C.), then transparent glass microsphere beads (ranging from approximately 40-120 micrometers in diameter with a median diameter of 86 micrometers) were poured onto the polyethylene surface and left for approximately 2 minutes. The carrier web sheet was then removed from the oven, the sheet was tilted to allow excess beads to pour off the web. The sheet was subsequently heated to approximately 320° F. (160° C.) to cause the beads to partially sink into the polyethylene. The resulting bead layer was brushed with a soft-bristled paint brush to remove any loosely attached bead materials.

The resulting bead layer was then coated with a black colored polymer coating (see Table 2 for composition) using a notch bar with 0.002" (51 micrometers) gap and then dried at 140° F. (60° C.) for 3 minutes followed by 194° F. (90° C.) for 2 minutes. The black color coated sample was then vacuum coated with a layer of aluminum thin film, followed by coating of a bead binder layer (see Table 3 for composition) using a notch bar coater at 0.008" (203 micrometer) gap and then dried at 190° F. (88° C.) for 30 seconds, laminated to a porous polyester fabric, followed by drying at 216° F. (102° C.) for 6 minutes. Example 1 is believed to have a quasi-permanent barrier layer. Examples 2-17 are believed to have permanent barrier layers. After overnight curing under ambient conditions, the temporary carrier web was removed and the samples were evaluated for retroreflectivity (coefficient of retroreflectivity $R_A$ was measured at 0.2° observation angle and 5° entrance angle), color performance and wash durability. Retroreflectivity measurements were made using procedures described in ASTM E810. Methods for color measurement are described in standardized procedures, for example ASTM E1347. For comparison of black color, the CIE 1976 convention of L*a*b* is used to describe the lightness (L*) and chromaticity (a*, b*). Wash testing used procedures described in ISO 6330—Method 2A.

TABLE 2

| Ingredient | Weight |
|---|---|
| Colorant-2 | 17.5 |
| DI water | 31.65 |
| Ethanol | 22.15 |
| DEG | 9.5 |
| PUD-1 | 15.51 |

TABLE 3

| Ingredient | Weight |
|---|---|
| PE-1 | 93.37 |
| Silane-3 | 1.83 |
| PI-2 | 4.62 |
| Cat-2 | 0.187 |

As shown in Table 4, the Example 1 with printed regions on the temporary carrier web was significantly blacker, i.e. lower L*, than Comparative Example 1 without printing, while maintaining $R_A$>100. Samples of Example 1 showed comparable wash performance (i.e. retroreflectivity (Ra) decrease and color change (ΔL* and ΔE) after 50 cycles) as Comparative Example 1. Percentage $R_A$ decrease is the percentage difference in Ra1 (before washing) and Ra2 (after a designated number of washes). Delta L* is the difference in L*1 (before washing) and L*2 (after a designated number of washes). Delta E is the geometric distance between two color points in a cartesian L*a*b* space, e.g., delta E=sqrt{(delta L*)^2+(delta a*)^2+(delta b*)^2}

TABLE 4

| Sample | Print Pattern | | Initial Retroreflectivity/Color | | | | 50 home wash cycles | | |
|---|---|---|---|---|---|---|---|---|---|
| | line width (um) | pitch (um) | Ra | L* | a* | b* | % $R_A$ decrease | ΔL* | ΔE |
| Comparative Example 1 | n/a | n/a | 362 | 28.0 | −0.20 | −0.19 | 64% | −3.8 | 3.1 |
| Example 1 | 62.5 | 355 | 295 | 25.5 | 0.39 | −0.52 | 67% | −1.0 | 1.4 |

As shown in Table 5, with a patterned barrier material layer, Examples 2 through 17 were significantly darker, i.e. lower L*, than Comparative Example 2 without printing, while maintaining $R_A$>100. The printing pattern of Examples 2 through 17 had a significant effect on initial Ra, L*, gloss, and pattern visibility. Gloss measurements were made using a Micro Tri-Gloss Meter using a procedure described by ASTM D2457-13. A pattern with narrow line width and a small pitch, such as that used in Examples 5 and 14, is not readily visible to the naked eye in the final retroreflective appliqué. In comparison, either increasing pitch with the same narrow line width of the line patterns, such as that used in Example 2 to 4, or increasing line width of the line patterns, such as that used in Example 6 to 13 increases daylight pattern visibility in the final retroreflective appliqué. An unexpected result of varying the pattern geometry was the dramatic change in gloss. It was found that a change from 7 to 84.7 while still maintaining high retroreflectivity was achievable by adjusting the pattern and printed area.

TABLE 5

| Example | Print Pattern (linewidth × pitch) | % Area Coverage of Flexoplate Patterns | $R_A$ | L* | a* | b* | Gloss (60 degree) | Printed Pattern Visible To The Naked Eye |
|---|---|---|---|---|---|---|---|---|
| Comparative Example 2 | n/a | 0 | 341 | 28.72 | 0.11 | −0.37 | 8.7 | N/A |
| Example 2 | 75 um × 500 um line | 15% | 341 | 26.49 | 0.46 | 0.57 | 7.4 | Yes |
| Example 3 | 75 um × 300 um line | 25% | 283 | 25.64 | 0.49 | 0.68 | 7.0 | Yes |
| Example 4 | 75 um × 250 um line | 30% | 277 | 24.82 | 0.19 | 0.35 | 13.6 | Barely |
| Example 5 | 75 um × 187.5 um line | 40% | 222 | 23.28 | 0.02 | −0.35 | 16.6 | No |
| Example 6 | 150 um × 1000 um line | 15% | 315 | 24.1 | 0.3 | 0.31 | 8.6 | Yes |

TABLE 5-continued

| Example | Print Pattern (linewidth × pitch) | % Area Coverage of Flexoplate Patterns | $R_A$ | L* | a* | b* | Gloss (60 degree) | Printed Pattern Visible To The Naked Eye |
|---|---|---|---|---|---|---|---|---|
| Example 7 | 150 um × 600 um line | 25% | 288 | 25.58 | 0.46 | 0.84 | 9.0 | Yes |
| Example 8 | 150 um × 500 um line | 30% | 266 | 24.95 | 0.45 | 0.88 | 9.3 | Yes |
| Example 9 | 150 um × 375 um line | 40% | 237 | 24.11 | 0.38 | 0.33 | 16.0 | Yes |
| Example 10 | 250 um × 1667 um line | 15% | 282 | 25.97 | 0.31 | 0.91 | 7.8 | yes |
| Example 11 | 250 um × 1000 um line | 25% | 288 | 26.79 | 0.47 | 0.92 | 9.9 | Yes |
| Example 12 | 250 um × 833.3 um line | 30% | 230 | 25.47 | 0.38 | 1.37 | 14.1 | Yes |
| Example 13 | 250 um × 625 um line | 40% | 209 | 25.56 | 0.4 | 1.57 | 18.7 | Yes |
| Example 14 | 75 um × 150 um square | 80% | 139 | 22.58 | −0.17 | −0.8 | 84.7 | No |
| Example 15 | 400 um × 1000 um dots | 12.5% | 291 | 25.22 | 0.3 | 0.74 | 15.2 | Yes |
| Example 16 | 200 um × 1000 um dots | 3% | 319 | 25.98 | 0.44 | 0.79 | 7.8 | Yes |
| Example 17 | 300 um × 1000 um dots | 7% | 273 | 26.22 | 0.48 | 0.61 | 12.0 | Yes |

Examples 18 Through 22 and Comparative Examples 3

For Examples 18 through 22, a 40 cm wide carrier web comprising a paper sheet coated with a layer of polyethylene was printed with a clear ink (Ink-2). The ink was flexographically printed onto the polyethylene surface with a Dupont 0.067 DPR HD stamp (Southern Graphics Systems, Brooklyn Park, Minn.) under the following conditions: a 4.0 BCM/in² anilox roll, 75 fpm line speed, and dried using two 2 foot-long ovens set to 175° F. (80° C.). The stamp contained various print (line width/pitch) patterns with different area coverage as described in Table 10. Comparative Example 3 was made using a non-printed carrier web.

For Examples 18 through 22 and Comparative Example 3, a sheet of paper-backed polyethylene carrier web as described was heated in a box oven to approximately 230° F. (110° C.), then transparent glass microsphere beads (ranging from approximately 40-120 micrometers in diameter with a median diameter of 86 micrometers) were poured onto the polyethylene surface and left for approximately 2 minutes. The carrier web sheet was then removed from the oven, the sheet was tilted to allow excess beads to pour off the web. The sheet was subsequently heated to approximately 320° F. (160° C.) to cause the beads to partially sink into the polyethylene. The protruding portions of the partially-submerged beads were then coated with a colored polymer coating containing a fluorescent yellow pigment using a notch bar coater with 50 micrometer gap. The composition of the colored polymer coating is shown in Table 6. The colored polymer coating (30% solids solution) was dried for 3 minutes at 149° F. (65° C.) and for 2 minutes at 194° F. (90° C.). Following the drying process, an additional clear polymer coating was deposited using at notch coater with a 50 micrometer gap. The chemical composition of the clear polymer coating is shown in Table 7. The coated web was then vapor-coated using a silver metal thin film.

TABLE 6

| Ingredient | Weight |
|---|---|
| PUD-2 | 3.6 |
| Colorant-3 | 3.3 |
| DI water | 3.0 |

TABLE 7

| Ingredient | Weight |
|---|---|
| Polyol-1 | 2.3 |
| PI-1 | 1.09 |
| Silane-1 | 0.25 |
| Silane-2 | 0.25 |
| Cat-1 | 0.02 |
| EA | 8.9 |

After metal vapor coating, the sample was coated with a colored bead bond composition described in Table 8, using a notch bar with a 175 micrometer thick gap, followed by a thermal treatment for 30 seconds at 160° F. (71° C.), and for 3 min at 180° F. (82° C.). The exposed surface of the bead bond layer was laminated to an adhesive layer coated on an aramid fabric. The adhesive layer (composition shown in Table 9) had a wet coating thickness of 0.23 mm (9 mils). The lamination used a nip roll laminator operating at a rotational speed of 20 inches/min (0.5 meters/min), 70 psi (482 kPa) at 220 F (104° C.). Examples 18-22 are believed to have permanent barrier layers.

TABLE 8

| Ingredient | Weight |
|---|---|
| PE-1 | 60.6 |
| PE-2 | 10.88 |
| Silane-3 | 1.21 |
| Colorant-3 | 6.93 |
| PI-2 | 2.43 |
| Cat-2 | 0.121 |
| MEK | 10.88 |
| MIBK | 6.93 |

TABLE 9

| Ingredient | Weight |
|---|---|
| MEK | 20.8 |
| DAA | 28.2 |
| FR-1 | 7.1 |
| TPU-1 | 14.3 |
| Ox-1 | 4.3 |
| Ox-2 | 23.3 |
| PI-2 | 2 |

Table 10 shows Y,x,y color and $R_A$ retroreflectivity values for Comparative Example 3 and Examples 18 through 22. Typically, higher Y and higher $R_A$ values are desired. Compared with the Comparative Example 3 without any print, the color luminance was significantly enhanced with incorporation of a relatively small print area in Example 18 through 22. It was surprising that such a color enhancement could be achieved without a significant decrease in retroreflectivity compared to the non-printed example.

TABLE 10

| Sample ID | Printed Pattern | % Area Coverage of Flexoplate Patterns | $R_A$ | Y | x | y |
|---|---|---|---|---|---|---|
| Comparative Example 3 | None | 0% | 360 | 68.0 | 0.3776 | 0.5164 |
| Example 18 | 200 um diameter × 1000 um pitch (dots) | 3% | 392 | 74.4 | 0.3816 | 0.5332 |
| Example 19 | 75 um LW × 500 um pitch (line) | 15% | 365 | 78.7 | 0.3833 | 0.5355 |
| Example 20 | 150 um LW × 1000 um pitch (line) | 28% | 284 | 82.2 | 0.3878 | 0.5380 |
| Example 21 | 75 um LW × 250 um pitch (line) | 30% | 274 | 87.7 | 0.3834 | 0.5388 |
| Example 22 | 75 um LW × 187.5 um pitch (line) | 40% | 172 | 90.8 | 0.3835 | 0.5405 |

Examples 23 Through 39

For Examples 23 through 39, a 40 cm wide carrier web comprising a paper sheet coated with a layer of polyethylene was printed using various inks with the compositions listed in Table 11. The ink was flexographically printed onto the polyethylene surface with a Dupont 0.067 DPR HD stamp (Southern Graphics Systems, Brooklyn Park, Minn.), with various printing patterns as described in Table 12, under the following conditions: a 4.0 BCM/in² anilox roll, 100 fpm line speed, and dried using two 2-foot-long ovens set to 245° F. (118° C.) oven temperature. Then the sheet of printed paper-backed polyethylene carrier web was heated in a box oven to approximately 230° F. (110° C.), then transparent glass microsphere beads (ranging from approximately 46-86 micrometers in diameter with a median diameter of 66 micrometers) were poured onto the polyethylene surface and left for approximately 2 minutes. The carrier web sheet was then removed from the oven, the sheet was tilted to allow excess transparent microsphere beads to pour off the web. The sheet was subsequently heated to approximately 320° F. (160° C.) to cause the transparent microsphere beads to partially sink into the polyethylene. The resulting bead layer was brushed with a soft-bristled paint brush to remove any loosely attached beads and/or beads attached to the barrier layer material, and processed similarly to Examples 2 through 17 to afford a black retro-reflective sheet.

The ease of the removing process for the loosely attached beads and/or beads attached to the barrier layer material by the soft-bristled paint brush from the bead coat was rated according to the following chart. While loosely attached beads were relatively easy to remove, in some instances additional force was required to remove beads attached to the barrier layer material.

| | Easiness rating | | |
|---|---|---|---|
| | Difficult | Medium | Easy |
| Removing process | Required more than 10 brush strokes with force that may causes un-intended bead loss from the beaded regions | Required 5-10 brush strokes with force | Required 3 or even fewer times of gentle brush strokes |

Table 12 shows again the printing pattern in Examples 23 through 39 had a significant effect on initial $R_A$ and $L^*$. Unexpectedly, the ink composition had minimal effect on the performance of the black retro-reflective sheet, as the printed ink was readily dissolved by and interfused into the polymeric color layer; at the same time, the ink composition had a significant effect on the bead coating step, where higher percentage of pigment in the solid of the final ink composition led to easier removal of the loosely bound bead materials with a paint brush.

TABLE 11

| | Ink-3 | Ink-4 | Ink-5 | Ink-6 | Ink-7 |
|---|---|---|---|---|---|
| Colorant-2 | 9.8 | 22.4 | 41.1 | 61.3 | 85.5 |
| 25% PVA-1 in water | 89.7 | 76.1 | 57.5 | 37.2 | 13.0 |
| Surf-1 | 0.5 | 1.5 | 1.5 | 1.5 | 1.5 |
| % pigment in solid of final solution | 6% | 15% | 30% | 50% | 80% |

TABLE 12

| Example | Ink | Printed pattern | % Area Coverage of Flexoplate patterns | $R_A$ | Easiness rating of bead removing process | L* | a* | b* |
|---|---|---|---|---|---|---|---|---|
| Example-23 | Ink-3 | 150 um LW × 1000 um pitch (chevron) | 28% | 215 | difficult | 23.70 | 0.33 | −0.20 |
| Example-24 | Ink-4 | 75 um LW (random pattern 1) | 10% | 289 | medium | 24.65 | 0.44 | −0.66 |
| Example-25 | Ink-4 | 150 um LW × 1000 um pitch (chevron) | 28% | 218 | medium | 22.80 | 0.54 | −0.59 |
| Example-26 | Ink-4 | 100 um LW × 500 um pitch (square) | 36% | 216 | medium | 23.66 | 0.28 | −0.21 |
| Example-27 | Ink-4 | 125 um LW × 340 um pitch (square) | 60% | 151 | medium | 22.33 | 0.32 | −0.27 |
| Example-28 | Ink-5 | 75 um LW (random pattern 1) | 10% | 274 | easy | 23.97 | 0.40 | −0.90 |
| Example-29 | Ink-5 | 150 um LW × 1000 um pitch (chevron) | 28% | 198 | easy | 22.38 | 0.23 | −0.27 |
| Example-30 | Ink-5 | 100 um LW × 500 um pitch (square) | 36% | 184 | easy | 21.88 | 0.41 | −0.71 |
| Example-31 | Ink-5 | 125 um LW × 340 um pitch (square) | 60% | 128 | easy | 20.47 | 0.36 | −0.59 |
| Example-32 | Ink-6 | 75 um LW (random pattern 1) | 10% | 286 | easy | 23.83 | 0.37 | −0.65 |
| Example-33 | Ink-6 | 150 um LW × 1000 um pitch (chevron) | 28% | 191 | easy | 23.31 | 0.40 | −0.11 |
| Example-34 | Ink-6 | 100 um LW × 500 um pitch (square) | 36% | 201 | easy | 22.49 | 0.19 | −0.35 |
| Example-35 | Ink-6 | 125 um LW × 340 um pitch (square) | 60% | 147 | easy | 20.60 | 0.34 | −0.44 |
| Example-36 | Ink-7 | 75 um LW (random pattern 1) | 10% | 269 | easy | 24.63 | 0.59 | −0.53 |
| Example-37 | Ink-7 | 150 um LW × 1000 um pitch (chevron) | 28% | 207 | easy | 22.37 | 0.31 | −0.24 |
| Example-38 | Ink-7 | 100 um LW × 500 um pitch (square) | 36% | 200 | easy | 23.22 | 0.18 | −0.03 |
| Example-39 | Ink-7 | 125 um LW × 340 um pitch (square) | 60% | 97 | easy | 21.85 | 0.26 | −0.23 |

Although specific embodiments have been illustrated and described herein for purposes of description, it will be appreciated by those of ordinary skill in the art that a wide variety of alternate and/or equivalent implementations may be substituted for the specific embodiments shown and described without departing from the scope of the present invention. This application is intended to cover any adaptations or variations of the embodiments discussed herein.

What is claimed is:

1. A retroreflective article comprising:
   a layer of optical elements embedded in a bead bond layer, the optical elements comprising:
   a layer of transparent microsphere beads embedded in a bead bond layer in a predetermined pattern comprising beaded and unbeaded regions, wherein the unbeaded region is substantially without beads and comprises a region that contains beads if beads were deposited on the bead bond layer without a barrier layer;
   at least one polymeric color layer covering at least a portion of the transparent microsphere beads embedded in the bead bond layer and covering at least a portion of each unbeaded region; and
   at least one reflective layer covering at least a portion of the polymeric color layer covering at least a portion of the transparent microsphere embedded in the bead bond layer.

2. The retroreflective article of claim 1 further comprising a barrier layer material covering the polymeric color layer in the unbeaded regions.

3. The retroreflective article of claim 2 wherein the barrier layer material is interfused with the polymeric color layer at least in the unbeaded regions.

4. The retroreflective article of claim 2 wherein the barrier layer material has a thickness of about 10 nm to about 100 um.

5. The retroreflective article of claim 1 wherein the polymeric color layer is about 1um to about 100 um between the microsphere beads.

6. The retroreflective article of claim 1 wherein the coefficient of retroreflectivity is at least 100, wherein the color luminance is greater than about 40 for a fluorescent red-orange color.

7. The retroreflective article of claim 1 wherein the coefficient of retroreflectivity is at least 100, wherein the color luminance is greater than about 70 for a fluorescent yellow-green color.

8. The retroreflective article of claim 1 having a minimum RA of at least 50, wherein the L* is less than about 35 for a black color.

9. The retroreflective article of claim 1 wherein the beaded and unbeaded regions are not visible to the naked eye.

10. The retroreflective article of claim 1 having a minimum RA value of at least 50 after fifty washes using ISO 6330 Method 2A.

11. The retroreflective article of claim 1 having a minimum RA value of at least 50 and a Delta E value of less than 5 after fifty washes using ISO 6330 Method 2A.

12. An article of clothing comprising:
   a fabric with a first major surface and a second major surface; and
   a retroreflective appliquattached to the first major surface of the fabric, the retroreflective applique comprising:
   a layer of optical elements embedded in a bead bond layer, the optical elements comprising:
   a layer of transparent microspheres beads embedded in a bead bond layer in a predetermined pattern comprising beaded and unbeaded regions, wherein the unbeaded region is substantially without beads and comprises a region that contains beads if beads were deposited on the bead bond layer without a barrier layer;
   at least one polymeric color layer covering at least a portion of the transparent microsphere beads embedded in the bead bond layer and covering at least a portion of each unbeaded region; and
   at least one reflective layer covering at least a portion of the polymeric color layer covering at least a portion of the transparent microsphere embedded in the bead bond layer.

13. The article of claim 12 wherein the fabric comprises a pattern having a particular spacing and the retroreflective applique pattern comprises a repeat spacing in any specified direction which differs from the fabric pattern spacing along the same direction by less than 60% of said fabric pattern spacing.

14. The reflective article of claim 12 wherein the beaded and unbeaded regions are not visible to the naked eye.

15. The article of claim 12 having a minimum RA value of at least 50 after fifty washes using ISO 6330 Method 2A.

16. The article of claim 12 having an RA value of at least 50 and a Delta E value of less than 5 after fifty washes using ISO 6330 Method 2A.

17. A method of preparing a retroreflective article comprising:
   providing a polymeric carrier having a first major surface and a second major surface;
   depositing barrier layer material onto portions of the first major surface of the polymeric carrier in a predetermined pattern;
   partially embedding transparent microsphere beads into the portions of the first major surface of the polymeric carrier not covered by the barrier layer material such that the beads at least partially protrude from the first major surface of the polymeric carrier to form a patterned layer comprising beaded and unbeaded regions;
   depositing a polymeric color layer on at least portions of the beaded and unbeaded regions;
   depositing a reflective layer on at least a portion of the polymeric color layer which covers the transparent microsphere beads;
   depositing a bead bond layer on at least a portion of the reflective layer and any exposed portions of underlying layers; and
   removing the polymeric carrier.

18. The method of claim 17 further comprising removing the barrier layer material after the polymeric carrier is removed.

19. The method of claim 17 wherein the barrier layer material is removed after partially embedding transparent microsphere beads into the portions of the first major surface of the polymeric carrier not covered by the barrier layer material and prior to depositing the polymeric color layer.

20. The method of claim 17 wherein the barrier layer material interfuses with the polymeric color layer.

* * * * *

UNITED STATES PATENT AND TRADEMARK OFFICE
CERTIFICATE OF CORRECTION

PATENT NO. : 10,845,514 B2
APPLICATION NO. : 15/512865
DATED : November 24, 2020
INVENTOR(S) : Kui Chen-Ho It is certified that error appears in the above-identified patent and that said Letters Patent is hereby corrected as shown below:

On the Title Page

Page 2, Column 2, Line 3, Delete "6pgs." and insert -- 6 pgs. --, therefor.

In the Specification

Column 10, Line 51, Delete "retroflectivity" and insert -- retroreflectivity --, therefor.

Column 16, Line 67, Delete "Na3" and insert -- Na3, --, therefor.

Column 18, Line 43, Delete "and or" and insert -- and/or --, therefor.

Columns 19-20, Line 27 (Approx.), Delete "Polyol1" and insert -- Polyol --, therefor.

Columns 19-20, Line 69 (Approx.), Delete "Methy" and insert -- Methyl --, therefor.

In the Claims

Column 31, Line 2, In Claim 5, delete "lum" and insert -- 1 um --, therefor.

Column 31, Line 27, In Claim 12, delete "appliquattached" and insert -- appliqué attached --, therefor.

Column 32, Line 1, In Claim 13, delete "applique" and insert -- appliqué --, therefor.

Column 32, Line 5, In Claim 14, delete "reflective".

Signed and Sealed this
Twenty-eighth Day of December, 2021

Drew Hirshfeld
*Performing the Functions and Duties of the*
*Under Secretary of Commerce for Intellectual Property and*
*Director of the United States Patent and Trademark Office*